United States Patent
Lipschutz

(10) Patent No.: US 7,593,330 B1
(45) Date of Patent: Sep. 22, 2009

(54) PROCESSING OF PARTIAL FRAMES AND PARTIAL SUPERFRAMES

(75) Inventor: David Lipschutz, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 585 days.

(21) Appl. No.: 11/341,438

(22) Filed: Jan. 30, 2006

(51) Int. Cl.
*H04J 3/14* (2006.01)
*H04L 12/26* (2006.01)
*H04L 12/54* (2006.01)

(52) U.S. Cl. .................. 370/230; 370/412; 370/429; 370/474

(58) Field of Classification Search ............ 370/230, 370/412, 429, 474
See application file for complete search history.

(56) References Cited

U.S. PATENT DOCUMENTS

| | | | |
|---|---|---|---|
| 4,547,877 A | 10/1985 | Lehman et al. | |
| 5,307,343 A | 4/1994 | Bostica et al. | |
| 5,475,682 A * | 12/1995 | Choudhury et al. | 370/229 |
| 5,541,912 A | 7/1996 | Choudhury et al. | |
| 5,644,577 A * | 7/1997 | Christensen et al. | 370/506 |
| 5,812,527 A * | 9/1998 | Kline et al. | 370/232 |
| 5,936,939 A * | 8/1999 | Des Jardins et al. | 370/229 |
| 6,026,093 A * | 2/2000 | Bellaton et al. | 370/412 |
| 6,400,732 B1 | 6/2002 | Castagna et al. | |
| 6,700,869 B1 | 3/2004 | Falco et al. | |
| 6,888,824 B1 * | 5/2005 | Fang et al. | 370/359 |
| 6,907,473 B2 | 6/2005 | Schmidt et al. | |
| 7,039,067 B2 | 5/2006 | Feinberg et al. | |
| 7,050,440 B2 * | 5/2006 | Colmant et al. | 370/395.1 |
| 7,072,298 B2 * | 7/2006 | Paul et al. | 370/231 |
| 7,149,212 B2 * | 12/2006 | Calvignac et al. | 370/360 |
| 7,369,496 B1 * | 5/2008 | Wiggins et al. | 370/235 |
| 7,372,864 B1 * | 5/2008 | Reast et al. | 370/428 |
| 7,385,965 B2 * | 6/2008 | McCormick et al. | 370/355 |
| 7,415,031 B2 * | 8/2008 | Primrose et al. | 370/419 |
| 2002/0010891 A1 | 1/2002 | Klein | |
| 2002/0114335 A1 | 8/2002 | Namura | |
| 2002/0196778 A1 * | 12/2002 | Colmant et al. | 370/352 |
| 2005/0025141 A1 * | 2/2005 | Chao et al. | 370/386 |
| 2005/0073956 A1 * | 4/2005 | Moores et al. | 370/235 |
| 2005/0088969 A1 * | 4/2005 | Carlsen et al. | 370/229 |
| 2006/0106946 A1 * | 5/2006 | Agarwal et al. | 709/250 |
| 2006/0221945 A1 * | 10/2006 | Chin et al. | 370/381 |

OTHER PUBLICATIONS

David Lipschutz et al.; U.S. Appl. No. 11/221,700; entitled "Scalable Central Memory Switching Fabric"; filed Sep. 9, 2005; 43 pages.

* cited by examiner

*Primary Examiner*—Alpus H Hsu
(74) *Attorney, Agent, or Firm*—Harrity & Harrity, LLP

(57) ABSTRACT

A system receives a set of datagrams and forms frames based on the datagrams, where at least one of the frames includes data associated with multiple ones of the datagrams. The system writes the frames to memory to form superframes in the memory, where each of the superframes includes multiple ones of frames. The system reads the superframes from the memory, recreates the datagrams based on the superframes, and outputs the datagrams.

29 Claims, 13 Drawing Sheets ns of the invention may be implemented;

PROCESSING OF PARTIAL FRAMES AND PARTIAL SUPERFRAMES

BACKGROUND

1. Field of the Invention

Implementations consistent with the principles of the invention relate generally to data communication and, more particularly, to the use of a scalable central memory switching fabric architecture within a data transfer device.

2. Description of Related Art

A typical shared memory switching architecture includes input and output ports connected via a shared memory switching fabric. Typically, a shared memory switching architecture is used only when the desired aggregate system bandwidth can be achieved using a memory data width equal to or less than a cell size (for cell systems) or a minimum packet size (for packet systems). The shared memory switch architecture sometimes includes multiple memory subsystems. In this case, statistical or hash-based load balancing may be used between the memory subsystems. These approaches can be blocking and/or slower than wire speed.

For high bandwidth systems, lightly buffered or unbuffered cross-point architectures are typically used. These architectures often include delay-bandwidth buffer memory at the ingress and egress line cards. As a result, the memory bandwidth of the system is reduced to that of the line card instead of that of the entire system. With the cross-point architecture, each packet is written and read twice at each of the line cards. Therefore, the total system memory bandwidth required is double that of a shared memory switching architecture. Further, cross-point architectures typically have significant blocking characteristics on a port-to-port basis when there are many sub-ports (streams) per line card.

SUMMARY

According to one aspect, a data transfer device may include a set of ingress units, a set of egress units, and a memory connected to the ingress units and the egress units. At least some of the ingress units may be configured to receive a group of datagrams, form a frame from one or more of the datagrams, and output the frame to the memory. The memory may be configured to receive the frames from the ingress units, store the frames to form superframes, and output the superframes to the egress units. At least some of the egress units may be configured to receive one of the superframes from the memory, reassemble a datagram from data in the superframe and/or a subsequent superframe, and output the datagram.

According to another aspect, a method may include receiving a group of datagrams; forming frames based on the datagrams, where each of the frames may include data associated with one or more of the datagrams; writing the frames to memory to form superframes in the memory, where each of the superframes may include multiple frames; reading the superframes from the memory; reassembling the datagrams based on the superframes; and outputting the reassembled datagrams.

According to yet another aspect, an ingress line card is associated with a data transfer device. The ingress line card may include an interface to receive a group of datagrams and form frames based on the datagrams. Each of the frames may include a header portion and a data portion, where the data portion is capable of storing data associated with multiple datagrams, and the header portion may identify a break between datagrams when the data portion stores data associated with multiple datagrams. The ingress line card may also include a memory to store the datagrams prior to the frames being formed based on the datagrams.

According to a further aspect, an egress line card is associated with a data transfer device. The egress line card may include an interface to receive a group of superframes, where each of the superframes may include data associated with multiple datagrams, and at least one of the superframes may include data less than an entire datagram. The interface may also determine whether all data associated with a datagram is included in one or more of the superframes and reassemble the datagram when all data associated with the data is included in one or more of the superframes. The egress line card may also include a memory to store data associated with the datagrams prior to the datagrams being reassembled.

According to another aspect, a data transfer device may include an ingress unit, a central switching fabric, and an egress unit. The ingress unit may receive a group of datagrams, where each of the datagrams may be associated with an egress point. The ingress unit may also pack data associated with the datagrams into first containers, where each of the first containers may be capable of storing data associated with multiple datagrams. The central switching fabric may pack a group of the first containers into each of a group of second containers, where the first containers associated with a particular one of the second containers may include data associated with datagrams associated with a same egress point. The egress unit may receive one or more of the second containers from the central switching fabric, recreate the datagrams from data in the one or more of the second containers, and output the datagrams.

According to a further aspect, a data transfer device may include a central switching fabric. The central switching fabric may include a central shared memory to receive first data of a first length, store the first data as second data of a second length, where the second length is larger than the first length, and output the second data.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the principles of the invention relate to a central shared memory switching fabric that is scalable, reduces the amount of memory (buffering) needed, and is more ideal in terms of blocking over existing switching fabrics. All of the memory bandwidth is available as needed for each incoming datagram regardless of the destination of the incoming datagram. In other words, sufficient memory bandwidth is available even in the extreme case where datagrams from all of the inputs are destined for the same output.

Exemplary Device

Figure 1:
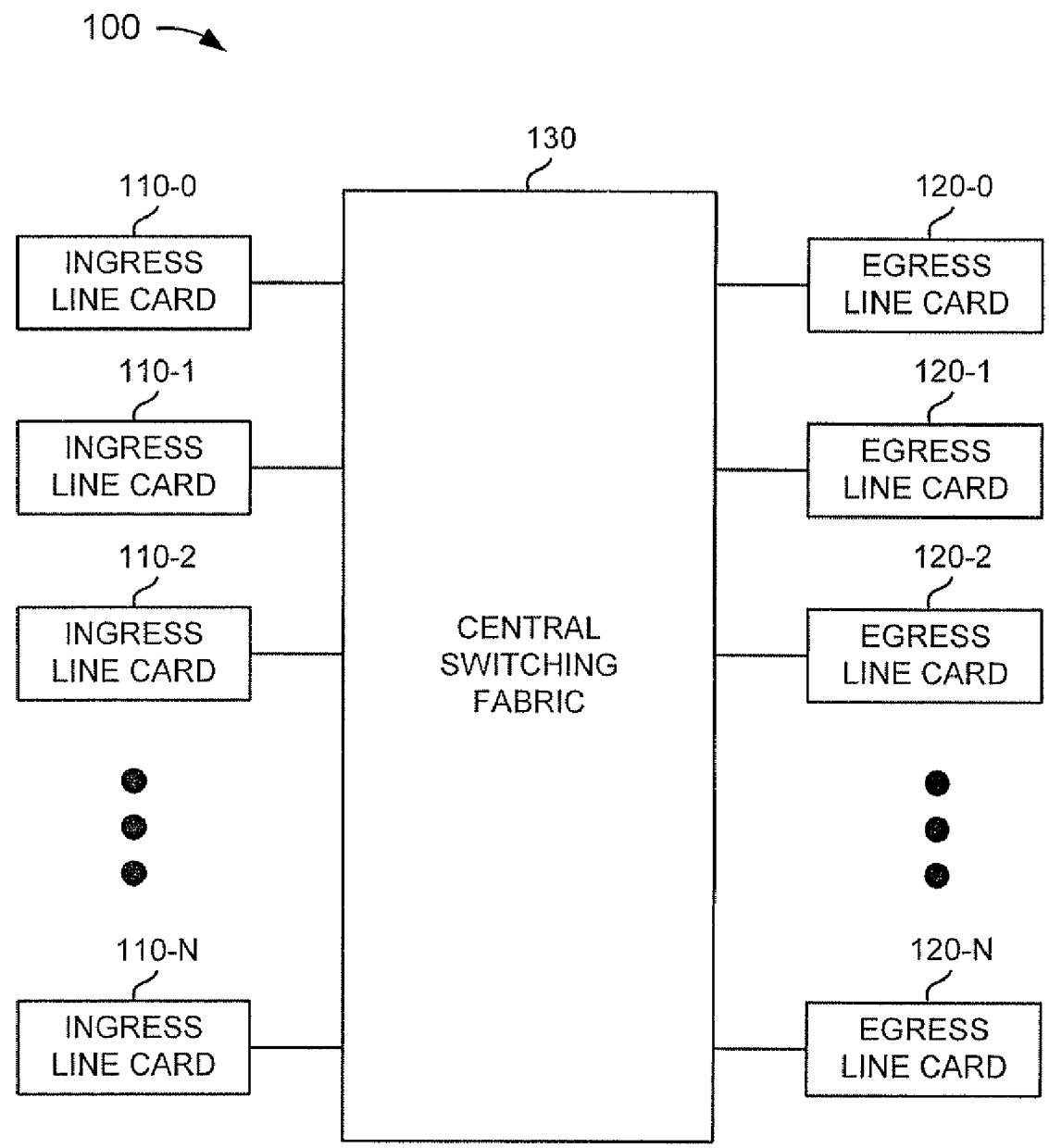
FIG. 1 is an exemplary diagram of a device in which systems and methods consistent with the principles of the invention may be implemented.

FIG. 1 is an exemplary diagram of a device 100 in which systems and methods consistent with the principles of the invention may be implemented. In one implementation, device 100 may correspond to a data transfer device, such as a router, a switch, a gateway, a bridge, or the like. Device 100 may include a set of ingress line cards 110-1 through 110-N (collectively referred to as "ingress line cards 110"), a set of egress line cards 120-1 through 120-N (collectively referred to as "egress line cards 120"), and a central switching fabric 130.

While FIG. 1 shows that device 100 includes separate sets of ingress line cards 110 and egress line cards 120, the functions of an ingress line card and an egress line card may be implemented within a single line card. In other words, a single line card may include ingress line card functionality as well as egress line card functionality. In another implementation, ingress line cards 110 and egress line cards 120 may be physically separate line cards and may differ in number. For example, there may be more or fewer ingress line cards 110 than egress line cards 120. In either implementation, ingress line cards 110 and egress line cards 120 may connect to central switching fabric via wired, wireless, and/or optical connections.

Ingress line cards 110 may include input units that receive streams of datagrams on ingress links and make the datagrams available to central switching fabric 130. A "datagram," as used herein, may refer to any type or form of data, including packet and non-packet data. Some of ingress line cards 10 may differ in speed and/or bandwidth. For example, a first ingress line card that connects to the core of a network, such as the Internet, may include more speed and/or bandwidth than a second ingress line card that connects to the edge of the network. In this case, the first ingress line card may include more ingress links (that may possibly be bound together as a single stream) than the second ingress line card.

Figure 2:
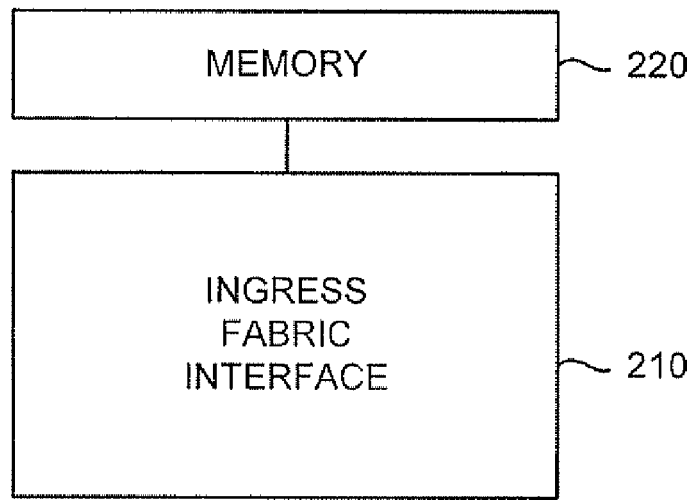
FIG. 2 is an exemplary block diagram of a portion of an ingress line card of FIG. 1 according to an implementation consistent with the principles of the invention.

FIG. 2 is an exemplary block diagram of a portion of ingress line card 110-0 according to an implementation consistent with the principles of the invention. Other ones of ingress line cards 10 may include the same or similar components.

As shown in FIG. 2, ingress line card 110-0 may include an ingress fabric interface 210 and a memory 220. Ingress fabric interface 210 may include a field programmable gate array (FPGA) or an application specific integrated circuit (ASIC). Ingress fabric interface 210 may receive streams of datagrams over one or more ingress links and generate frames based on the datagrams.

A frame may be thought of as a container that includes a fixed amount of data associated with one or more datagrams. In one implementation, a frame is 64 bytes in length. In another implementation, a frame is 256 bytes in length. In yet another implementation, a frame may have a length different from 64 or 256 bytes. A frame may be larger, smaller, or the same size as a datagram. Because the datagrams may differ in size, a frame may be larger than some datagrams, smaller than other datagrams, and the same size as yet other datagrams.

Ingress fabric interface 210 may pack datagrams into frames without regard to the beginnings and endings of the datagrams. In other words, the datagrams need not be aligned with the start and end of the frame. A frame may be filled quickly or gradually as datagrams arrive on the ingress link(s).

Figure 3:
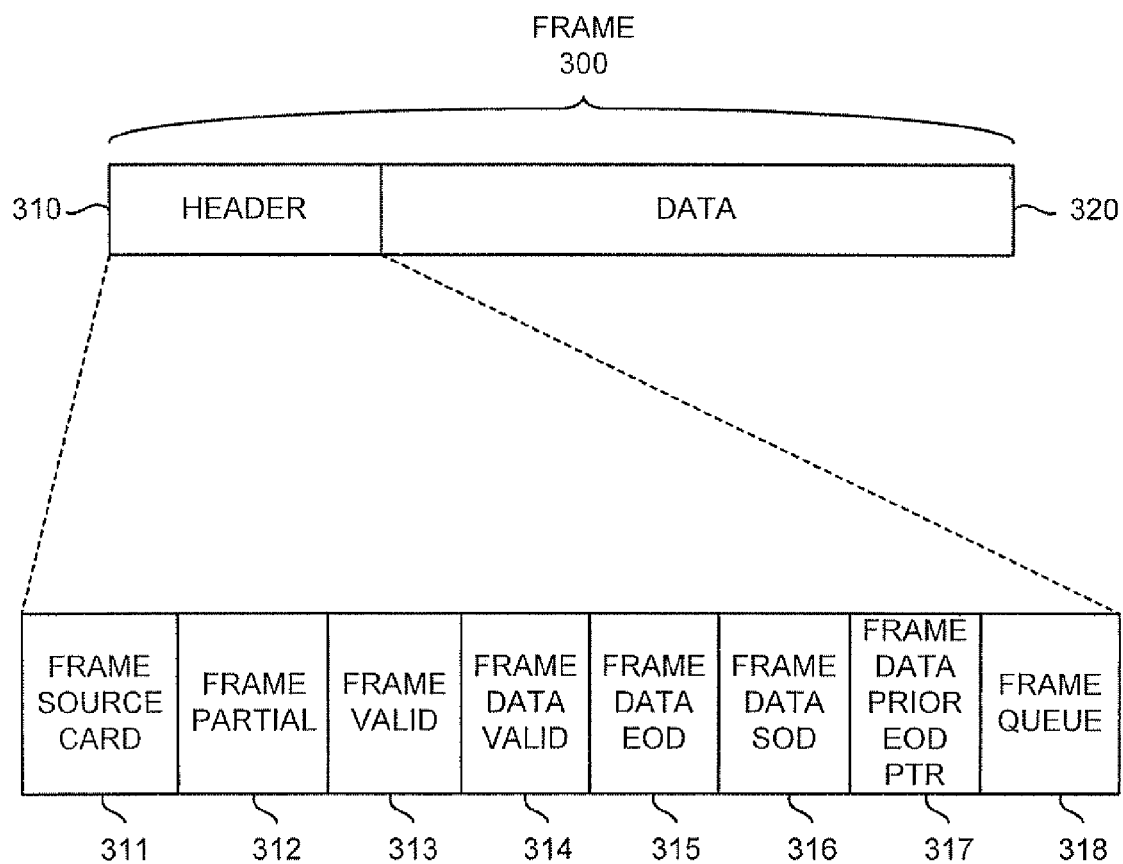
FIG. 3 an exemplary diagram of a frame according to an implementation consistent with the principles of the invention.

FIG. 3 is an exemplary diagram of a frame 300 according to an implementation consistent with the principles of the invention. Frame 300 may include a header portion 310 and a data portion 320. Header portion 310 may be generated by ingress fabric interface 210 (FIG. 2). Header portion 310 may be passed along with frame 300 within device 100 and may be used to reassemble the datagrams at egress line cards 120. In one implementation, header portion 310 is not used by central switching fabric 130, but is simply forwarded by central switching fabric 130 along with frame 300.

As shown in FIG. 3, header portion 310 may include frame source card field 311, frame partial field 312, frame valid field 313, frame data valid field 314, frame data end of datagram (EOD) field 315, frame data start of datagram (SOD) field 316, frame data prior EOD pointer (PTR) field 317, and frame queue field 318. In other implementations, header portion 310 may contain more, fewer, or different pieces of information.

Frame source card field 311 may identify the ingress line card that generated frame 300. Frame queue field 318 may identify a queue with which frame 300 is associated. As described below, the queue may be associated with a particular egress point of device 100. Frame source card field 311 and frame queue field 318 may be used for reassembly by an egress line card.

Frame partial field 312 may indicate whether frame 300 is complete. In some situations, it may be beneficial for an ingress line card to output a frame that is not completely filled with data from one or more datagrams. When frame partial field 312 indicates that frame 300 is not complete, then data portion 320 may be less than filled with data from one or more datagrams.

Frame valid field 313 may indicate whether frame 300 is valid. Frame data valid field 314 may indicate whether data portion 320 of frame 300 is completely empty. Frame data EOD field 315 may identify where the end of a datagram occurs within data portion 320. Frame data SOD field 316 may identify where the start of a datagram occurs within data portion 320. Frame data EOD field 315 and frame SOD field 316 may be used to identify a break between datagrams in frame 300 and identify where this break occurs. Frame data prior EOD pointer field 317 may indicate whether frame 300 contains one complete datagram.

Data portion 320 may store data associated with one or more datagrams. When data portion 320 stores data associated with multiple datagrams, the data may be packed together with no holes or gaps between them and without regard to the beginnings and endings of the datagrams. In other words, data portion 320 may store all or part of an entire datagram and may store parts of two or more datagrams.

Returning to FIG. 2, ingress fabric interface 210 may accumulate data for frames and when a frame is complete, it may output the frame and a notification. The notification may inform central switching fabric 130 (FIG. 1) that ingress line card 110-0 is outputting a frame. The notification may include information that identifies the egress point with which the frame is associated. An egress point may correspond to an egress link or port of an egress line card or some finer granularity, such as a class of traffic, a priority of traffic, a weight assigned to particular traffic or a particular link or port, etc.

Memory 220 may include a memory device, such as a SRAM. Memory 220 may include a number of bins (e.g., queues) to store datagrams for frames. In one implementation, memory 220 may include a bin for each egress point. Memory 220 may accumulate datagrams for a particular egress point in a corresponding bin until a complete frame's worth of data is accumulated. At this point, ingress fabric interface 210 may generate and output the frame.

Returning to FIG. 1, egress line cards 120 may include egress units that receive superframes from central switching fabric 130, reassemble datagrams from the superframes, and make the datagrams available to egress links. A superframe may be considered a container that includes a fixed number of frames, equal to or greater than two frames. In one implementation, a superframe includes sixteen frames. In another implementation, a superframe may include more or fewer frames.

Similar to ingress line cards 110, some of egress line cards 120 may differ in speed and/or bandwidth. For example, a first egress line card that connects to the core of a network, such as the Internet, may include more speed and/or bandwidth than a second egress line card that connects to the edge of the network. In this case, the first egress line card may include more egress links (that may possibly be bound together as a single stream) than the second egress line card.

Figure 4:
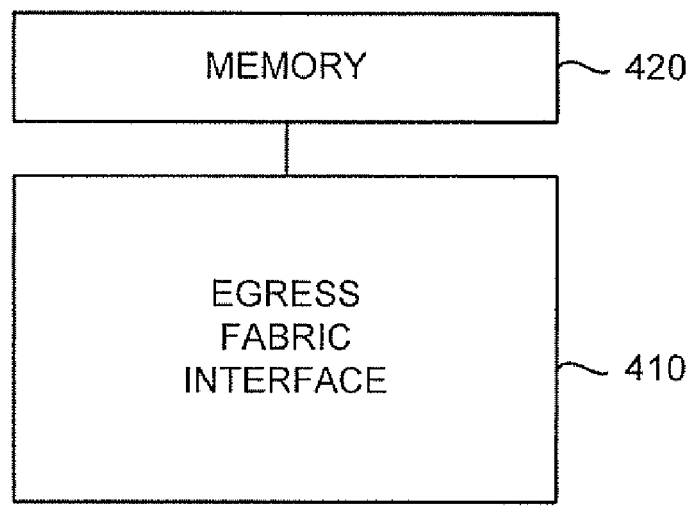
FIG. 4 is an exemplary diagram of a portion of the egress line card of FIG. 1 according to an implementation consistent with the principles of the invention.

FIG. 4 is an exemplary block diagram of a portion of egress line card 120-0 according to an implementation consistent with the principles of the invention. Other ones of egress line cards 120 may include the same or similar components.

As shown in FIG. 4, egress line card 120-0 may include an egress fabric interface 410 and a memory 420. Egress fabric interface 410 may include a FPGA or an ASIC. Egress fabric interface 410 may receive superframes, reassemble datagrams from the superframes, and make the datagrams available to egress links. Egress fabric interface 410 may use information in the headers of the frames within the superframes to identify datagram portions that belong to the same datagrams. For example, egress fabric interface 410 may use information in frame source card field 311 and frame queue field 318 (FIG. 3) to identify the particular datagram with which a frame is associated. Based on this information, egress fabric interface 410 may reassemble the datagrams and output the datagrams on one or more egress links.

Memory 420 may include a memory device, such as a SEAM. Memory 420 may include a number of bins (e.g., queues) to store data associated with datagrams. In one implementation, memory 420 may include a bin for each egress point and ingress point combination. An ingress point may correspond to an ingress link or port of an ingress line card or some finer granularity, such as a class of traffic, a priority of traffic, a weight assigned to particular traffic or a particular link or port, etc. Therefore, memory 420 may have a larger memory requirement than memory 220 (FIG. 2) of ingress line cards 110. Memory 420 may accumulate data associated with datagrams for a particular egress point and ingress point combination in a corresponding bin until all of the data is collected and the datagram can be reassembled. At this point, egress fabric interface 410 may output the datagram on an egress link.

Returning to FIG. 1, central switching fabric 130 may be implemented on a circuit card. Alternatively, there might be multiple planes of central switching fabrics 130 implemented on one or more circuit cards. Generally, central switching fabric 130 may store frames and schedule their transmission via egress line cards 120.

Figure 5:
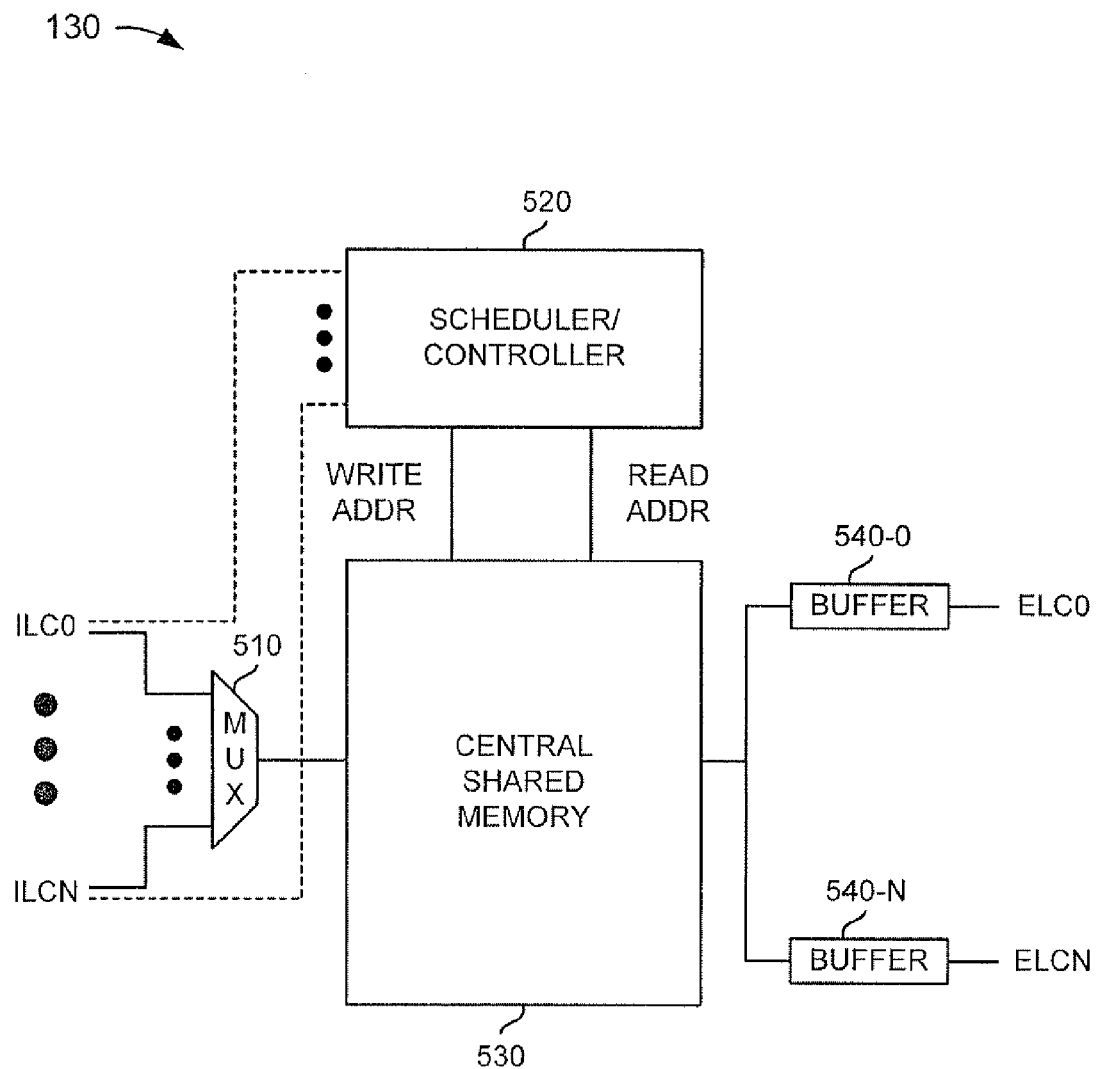
FIG. 5 is an exemplary diagram of a portion of the central switching fabric of FIG. 1 according to an implementation consistent with the principles of the invention.

FIG. 5 is an exemplary diagram of a portion of central switching fabric 130 according to an implementation consistent with the principles of the invention. As shown in FIG. 5, central switching fabric 130 may include a multiplexer 510, a scheduler/controller (S/C) 520, a central shared memory 530, and a set of buffers 540-0 through 540-N (collectively referred to as "buffers 540").

Multiplexer 510 may receive frames from ingress line cards 110 and forward them to memory 530. In one implementation, multiplexer 510 may be controlled to select certain frames to forward to memory 530. For example, S/C 520 may control multiplexer 510 to forward a frame at substantially the same time that S/C 520 outputs a write address corresponding to that frame. Alternatively, multiplexer 510 may select frames to forward according to a schedule, such as a round robin schedule.

S/C 520 may include a FPGA or an ASIC. S/C 520 may operate as a master bookkeeper for memory 530. S/C 520 may receive notifications from ingress line cards 110 when ingress line cards 110 send frames to multiplexer 510. S/C 520 may generate write addresses for storing the frames in memory 530 and read addresses for reading superframes from memory 530.

Figure 6:
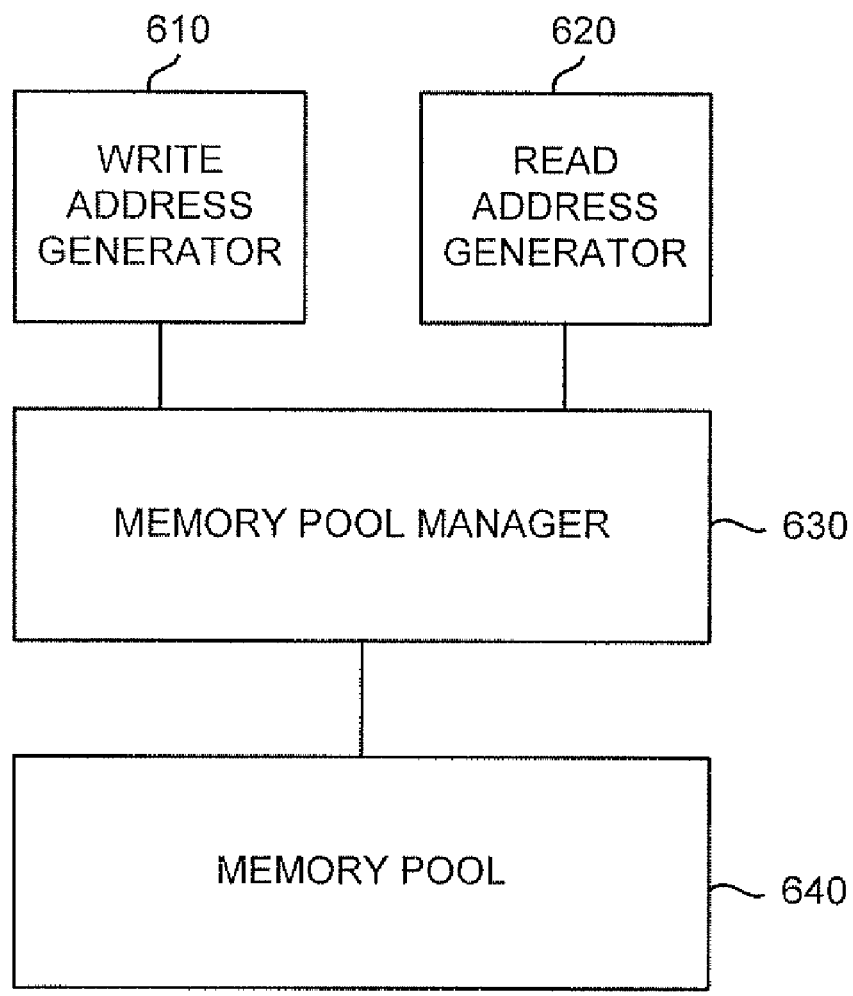
FIG. 6 is an exemplary diagram of a portion of the scheduler/controller of FIG. 5 according to an implementation consistent with the principles of the invention.

FIG. 6 is an exemplary diagram of a portion of S/C 520 according to an implementation consistent with the principles of the invention. As shown in FIG. 6, S/C 520 may include a write address generator 610, a read address generator 620, a memory pool manager 630, and a memory pool 640. Write address generator 610 may determine and generate write addresses for storing frames as superframes in memory 530. Read address generator 620 may determine and generate read addresses for reading superframes from memory 530.

Memory pool manager 630 may control the generation of write and read addresses by write address generator 610 and read address generator 620, respectively. Memory pool manager 630 may also track the addresses at which superframes are stored in memory 530. Memory pool manager 630 may track these addresses in queues of references to memory locations within memory 530 that contain data that needs to be sent to egress line cards 120. As described below, these queues may be maintained within memory pool 640.

Memory pool manager 630 may store frames associated with the same egress point together in the same superframe in memory 530. Memory pool manager 630 may allocate a buffer representing the superframe to a queue associated with the egress point and track how complete the superframe is. With the arrangement described herein, it does not matter whether the superframe gets completed gradually over time from a single ingress line card or all at once from multiple, possibly all, ingress line cards.

When memory pool manager 630 determines that the superframe is complete (i.e., filled with frames), memory pool manager 630 may enqueue it into a queue or list of superframes that are complete and pending transmission via a particular egress point. Because the superframe is bigger, possibly many times bigger, than a frame, memory pool manager 630 may have several clock cycles to identify the next superframe to be read from memory 530. Memory pool manager 630 may service each of the queues or lists of completed superframes equally (e.g., according to a round robin schedule). When priorities, weights, etc. are associated with the queues/lists, it may take memory pool manager 630 several clock cycles to determine which superframe is to be read next.

Memory pool 640 may include a memory device, such as a SRAM. Memory pool 640 may maintain a number of queues to store references to locations in memory 530. Memory pool 640 may also maintain a number of lists or queues of completed superframes. At a minimum, memory pool 640 may include one queue/list for each of egress line cards 120. In practice, however, memory pool 640 may include multiple queues/lists for each of egress line cards 120. For example, a queue/list may be set up to correspond to an output port of an egress line card 120, a class of traffic on the output port, a priority associated with the class of traffic on the output port, or some finer or other degree of granularity.

The queues/lists may be set up as point to point (a single ingress point to a single egress point), point to multi-point (a single ingress point to multiple egress points), multi-point to point (multiple ingress points to a single egress point), or multi-point to multi-point (multiple ingress points to multiple egress points). In the point to point case, a queue/list may be set up to store information (e.g., references to locations in memory 530 or information regarding completed superframes) associated with frames from a single ingress point destined for a single egress point. In the point to multi-point case, a queue/list may be set up to store information (e.g., references to locations in memory 530 or information regarding completed superframes) associated with frames from a single ingress point destined for multiple egress points. In the multi-point to point case, a queue/list may be set up to store information (e.g., references to locations in memory 530 or information regarding completed superframes) associated with frames from multiple ingress points destined for a single egress point. In the multi-point to multi-point case, a queue/list may be set up to store information (e.g., references to locations in memory 530 or information regarding completed superframes) associated with frames from multiple ingress points destined for multiple egress points.

The queues/lists may be maintained as linked lists within memory pool 640. This allows flexibility in the size of any particular queue/list and the location at which an item for the queue/list is stored within memory pool 640. For each queue/list, memory pool 640 may include a head pointer that identifies the top of the queue/list, a tail pointer that identifies the bottom of the queue/list, and for each item in the queue/list, a pointer to the next item in the queue/list. Memory pool 640 may also track how many items are in each queue/list.

Returning to FIG. 5, memory 530 may store frames as superframes. Memory 530 may contain sufficient bandwidth to write from all ingress line cards 110. As a result, there is no congestion at multiplexer 510.

Figure 7:
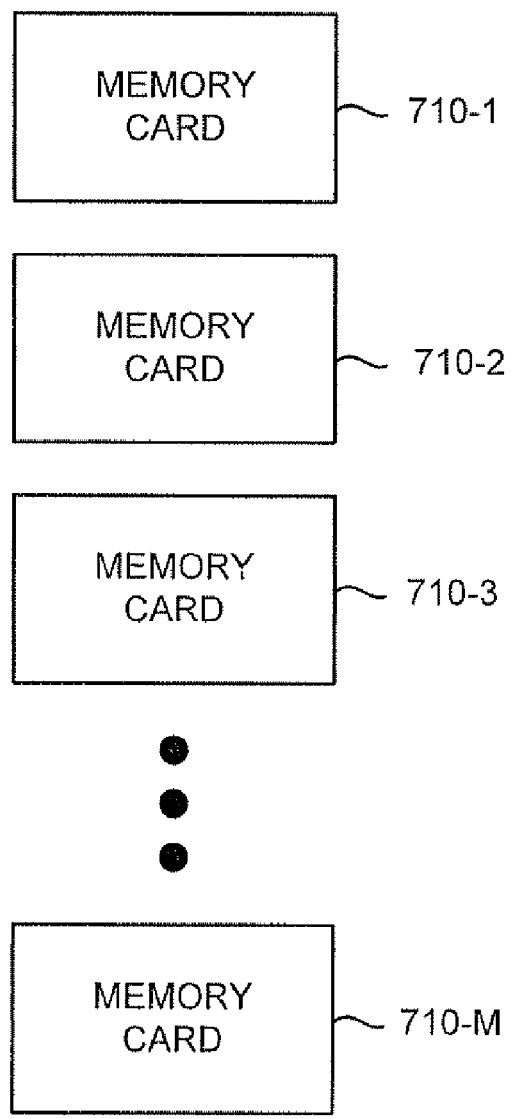
FIG. 7 is an exemplary diagram of a portion of the memory of FIG. 5 according to an implementation consistent with the principles of the invention.

FIG. 7 is a diagram of a portion of memory 530 according to an implementation consistent with the principles of the invention. As shown in FIG. 7, memory 530 may include a set of memory cards 710-1 through 710-M (collectively referred to as "memory cards 710"). Each of memory cards 710 may include a memory device, such as a SRAM or DRAM. The actual number of memory cards 710 included in memory 530 may be based on one or more network parameters (e.g., the throughput of device 100, the amount of network traffic traversing device 100, etc.). The bandwidth of memory 530 can be increased by adding one or more additional memory cards 710. Memory cards 710 may function as a logical memory device with a single read address, a single write address, and a wide data input/output.

One of memory cards 710 may be used as a backup memory. For example, this memory card may include an exclusive OR (XOR) of the data in the other memory cards. Therefore, when a memory card fails, the backup memory card can be used to recreate the data in the failed memory card and it can be hot swapped with the failed memory card.

Returning to FIG. 5, buffers 540 may include rate-matching memory devices, such as first-in, first-out (FIFO) memories. The read bandwidth of memory 530 may be much larger than the bandwidth that can be accepted by or that is desired by egress line cards 130. Buffers 540 may adjust the rate to that handled by egress line cards 130. It may also be desirable to include rate-matching memory devices on the ingress side between ingress line cards 110 and memory 530 (not shown).

Exemplary Processing

Figure 8:
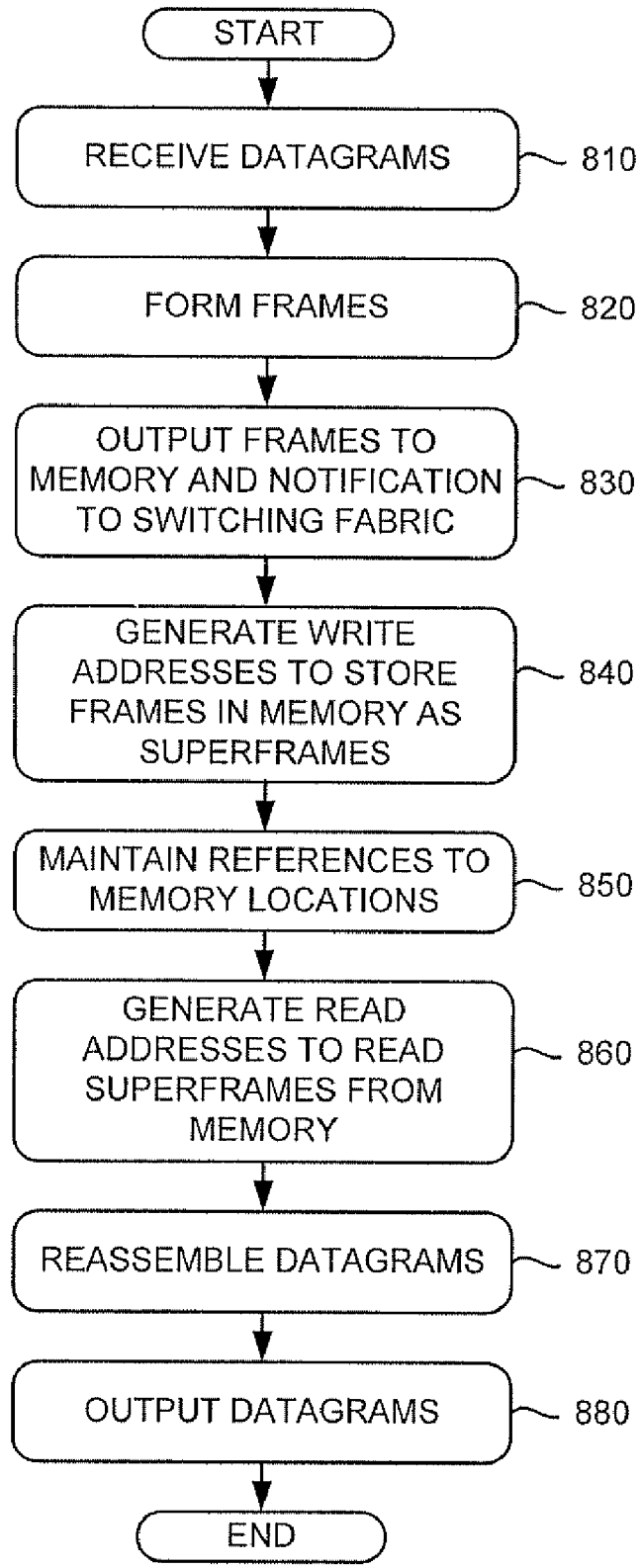
FIG. 8 is a flowchart of an exemplary operation for processing datagrams according to an implementation consistent with the principles of the invention.

FIG. 8 is a flowchart of an exemplary operation for processing datagrams according to an implementation consistent with the principles of the invention. FIGS. 9-14 illustrate processing that may be performed with regard to the exemplary operation of FIG. 8 according to an implementation consistent with the principles of the invention.

Figure 9:
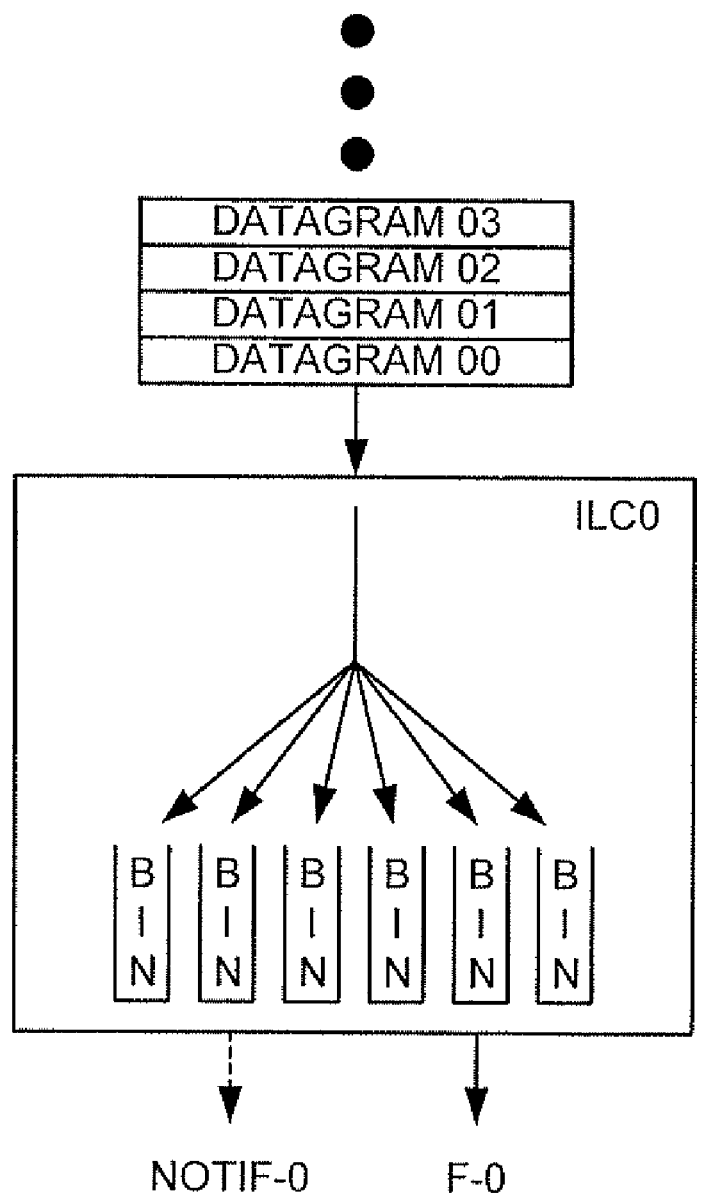
FIGS. 9-14 illustrate processing that may be performed with regard to the exemplary operation of FIG. 8 according to an implementation consistent with the principles of the invention.

Processing may begin with the receipt of datagrams on ingress links (block 810). As shown in FIG. 9, ingress line card ILC0 may receive a stream of datagrams. Ingress line card ILC0 may store the datagrams in bins based on the egress points with which the datagrams are intended. The bins may be considered frame containers that may be equal in size to the size of a frame.

Frames may be formed based on the datagrams (block 820). As shown in FIG. 9, ingress line card ILC0 may track the fullness of the bins. Once a bin is filled with a framers worth of data, regardless of the beginning and ending of any datagram within the bin, ingress line card ILC0 may form a frame based on the data in the bin. For example, ingress line card ILC0 may generate a header portion 310 (FIG. 3) and pack the data from the bin into a data portion 320 of a frame.

The completed frames and notifications may be output to central switching fabric 130 (block 830). As shown in FIG. 9, ingress line card ILC0 may output frame F-0 and notification NOTIF-0. Frame F-0 may correspond to a frame that has been generated by ingress line card ILC0. Notification NOTIF-0 may inform central switching fabric 130 that frame F-0 has been (or is being) output by ingress line card ILC0.

Figure 10:
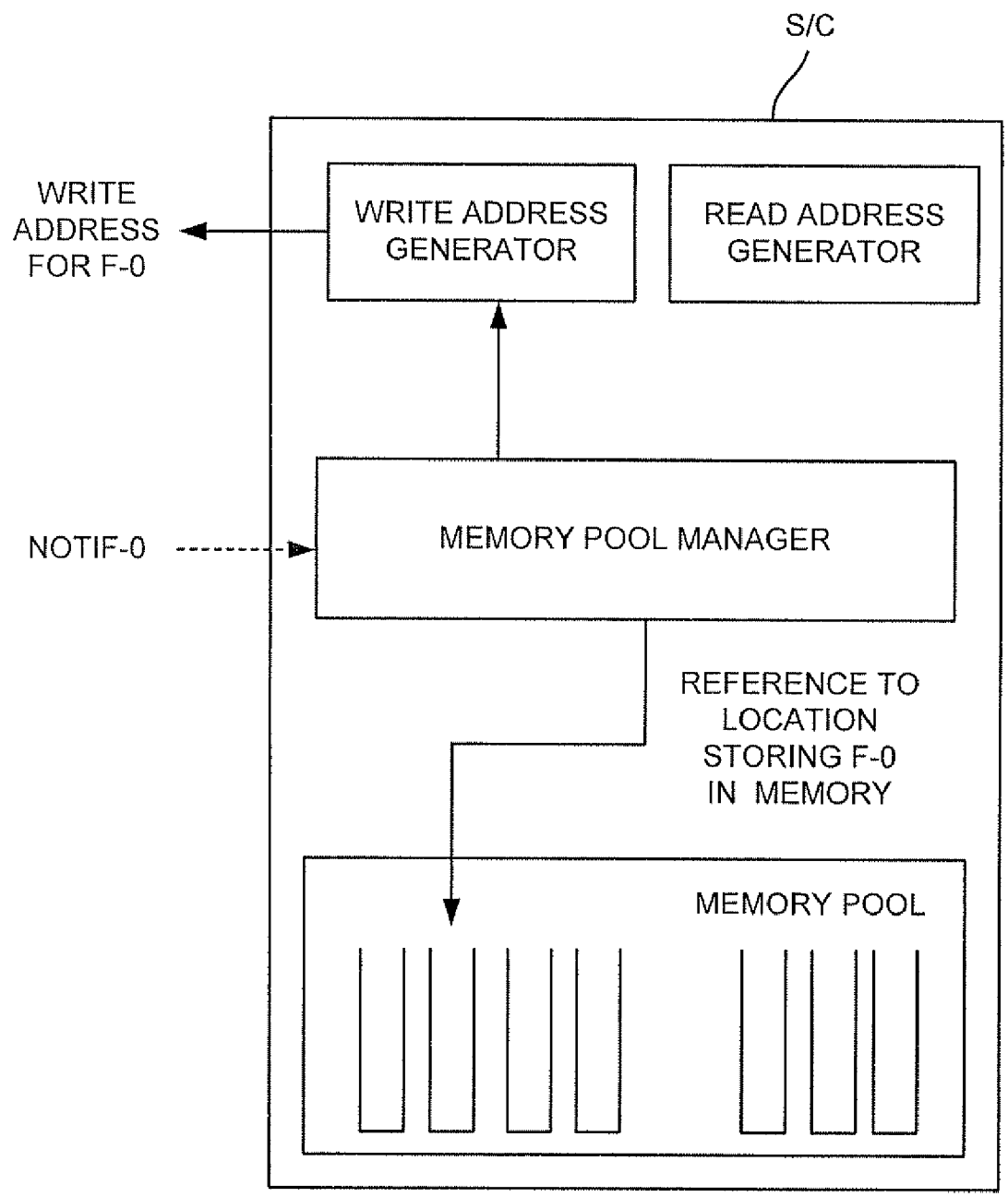
Figure 11:
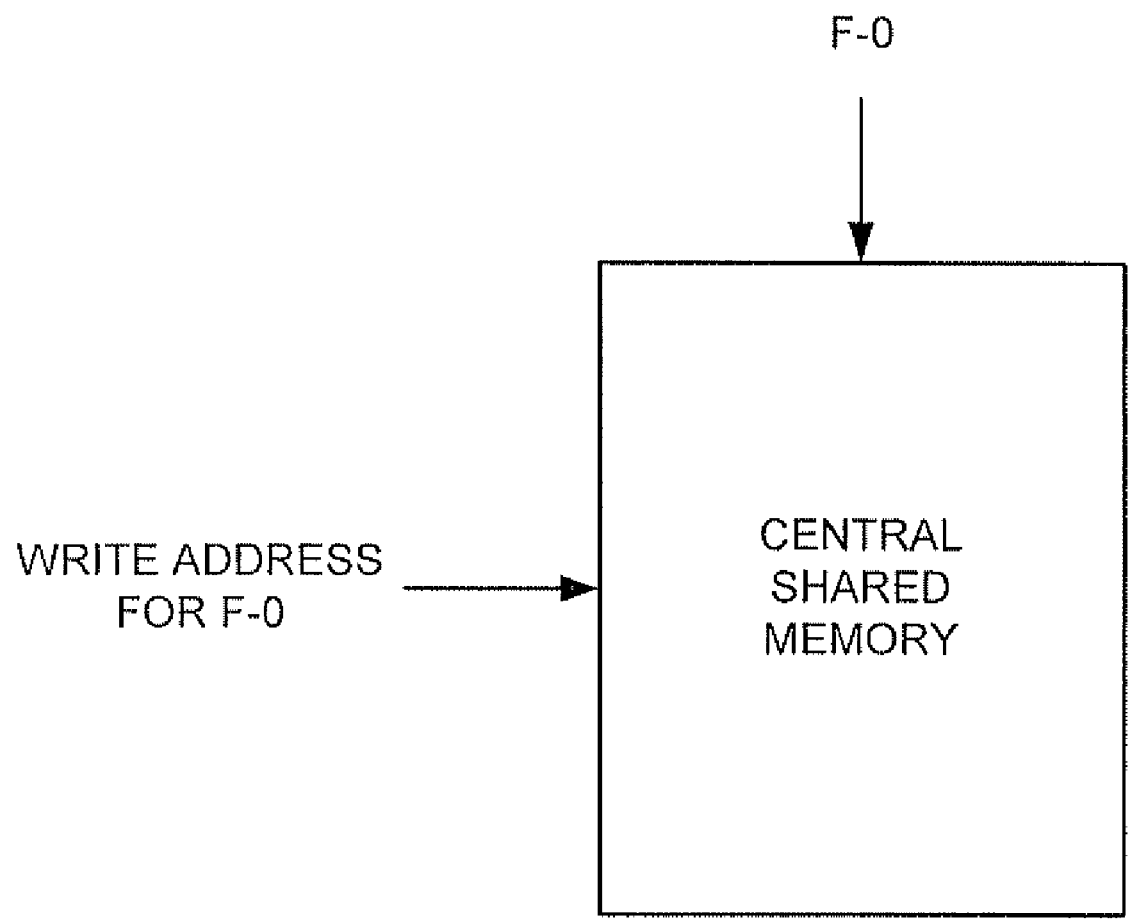
Figure 12:
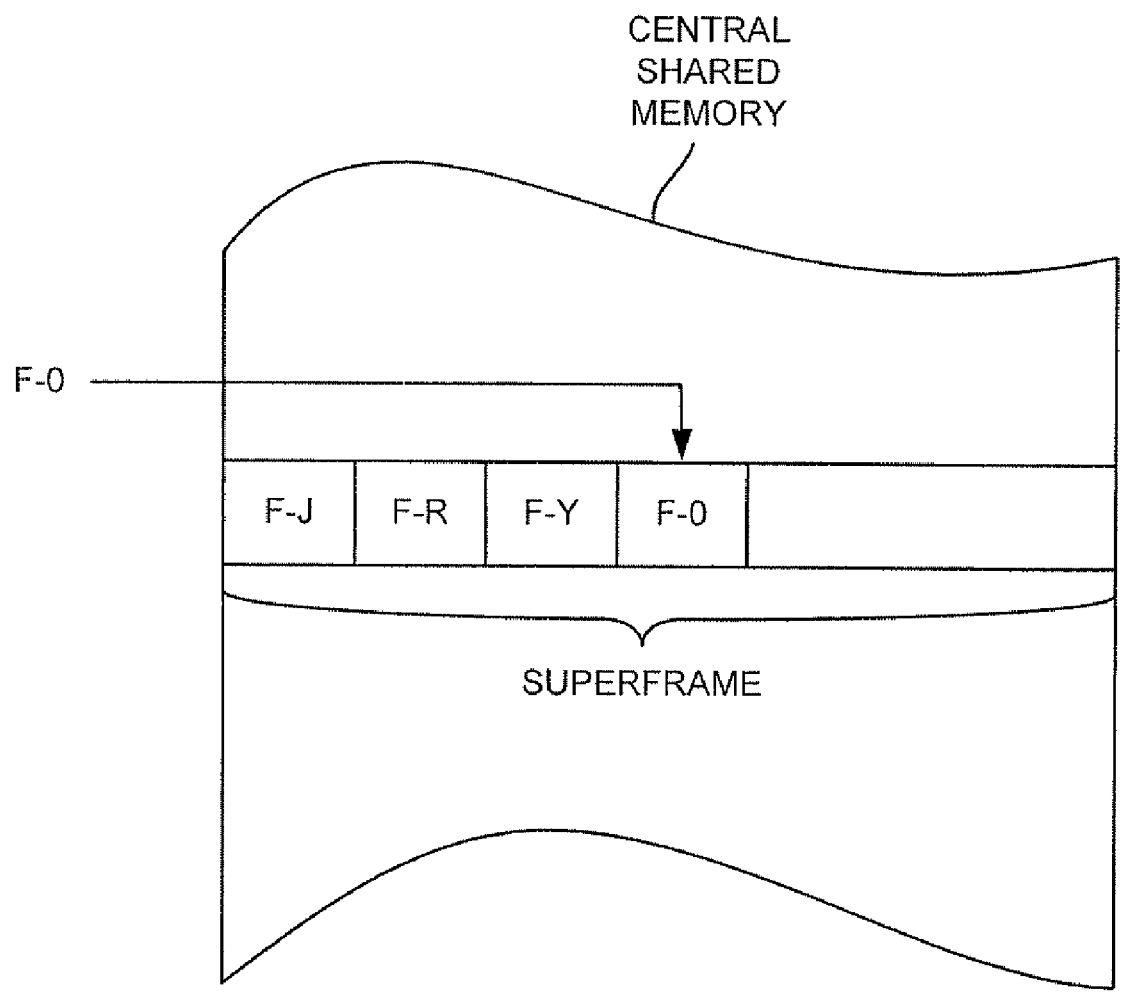

Write addresses may be generated for storing the frames in memory as superframes (block 840). In one implementation, a frame may be stored in memory every clock cycle. As shown in FIG. 10, scheduler/controller S/C may receive notification NOTIF-0 from ingress line card ILC0 S/C may generate a write address for storing frame F-0 in memory. As shown in FIG. 11, the write address may be used to identify the location at which frame F-0 is stored within the memory. As shown in FIG. 12, frame F-0 may be stored within a superframe in memory. As explained above, a superframe may be associated with a particular egress point. Therefore, as shown in FIG. 12, frames F-J, F-R, F-Y, and F-0 may be associated with the same egress point.

References to the locations in memory that the superframes are stored may be maintained (block 850). As shown in FIG. 10, the memory pool manager may store a reference to the location at which the superframe containing frame F-0 is stored in memory in one of several queues. The particular queue in which the reference is stored may correspond to the egress point associated with the superframe.

Figure 13:
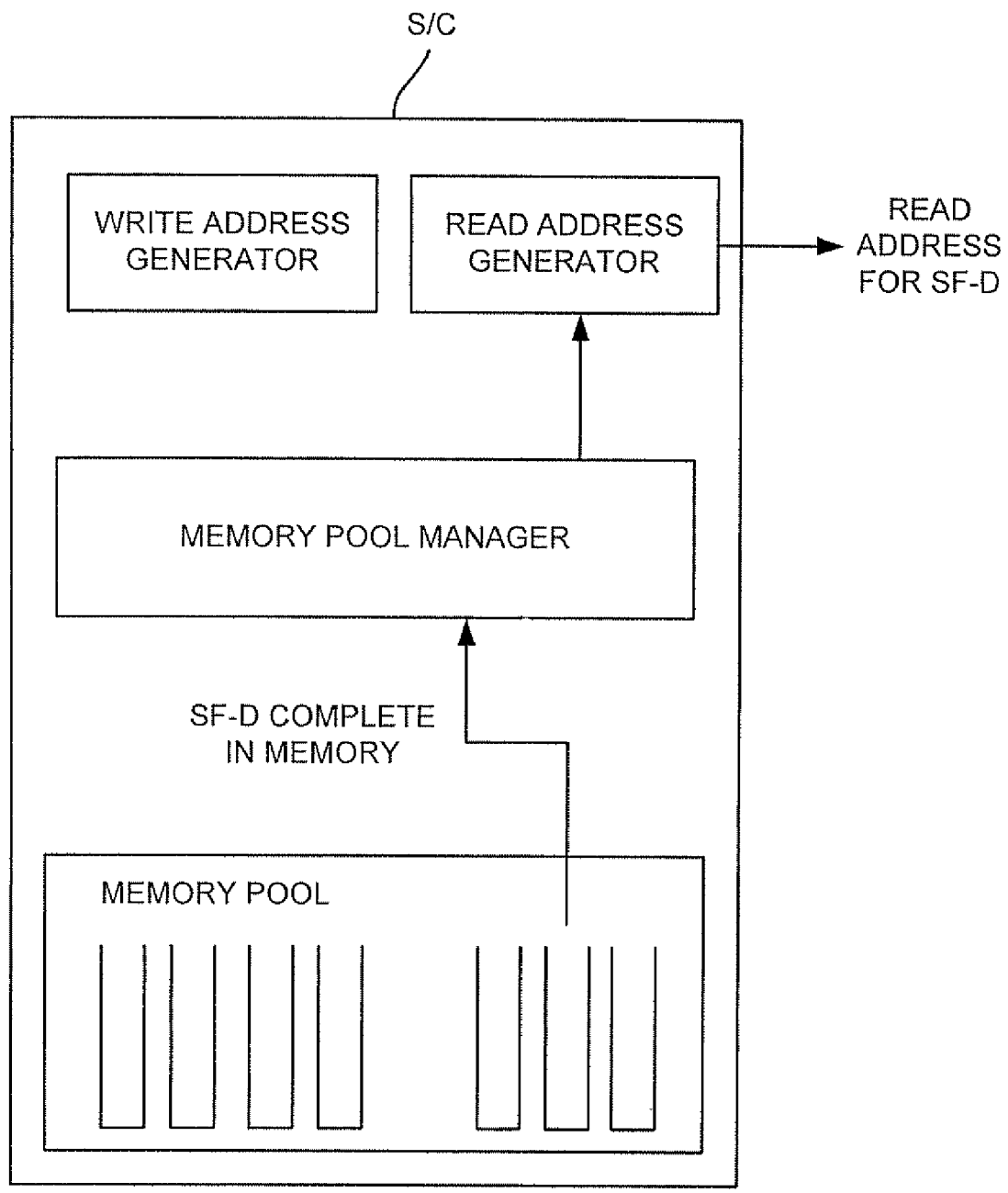
Figure 14:
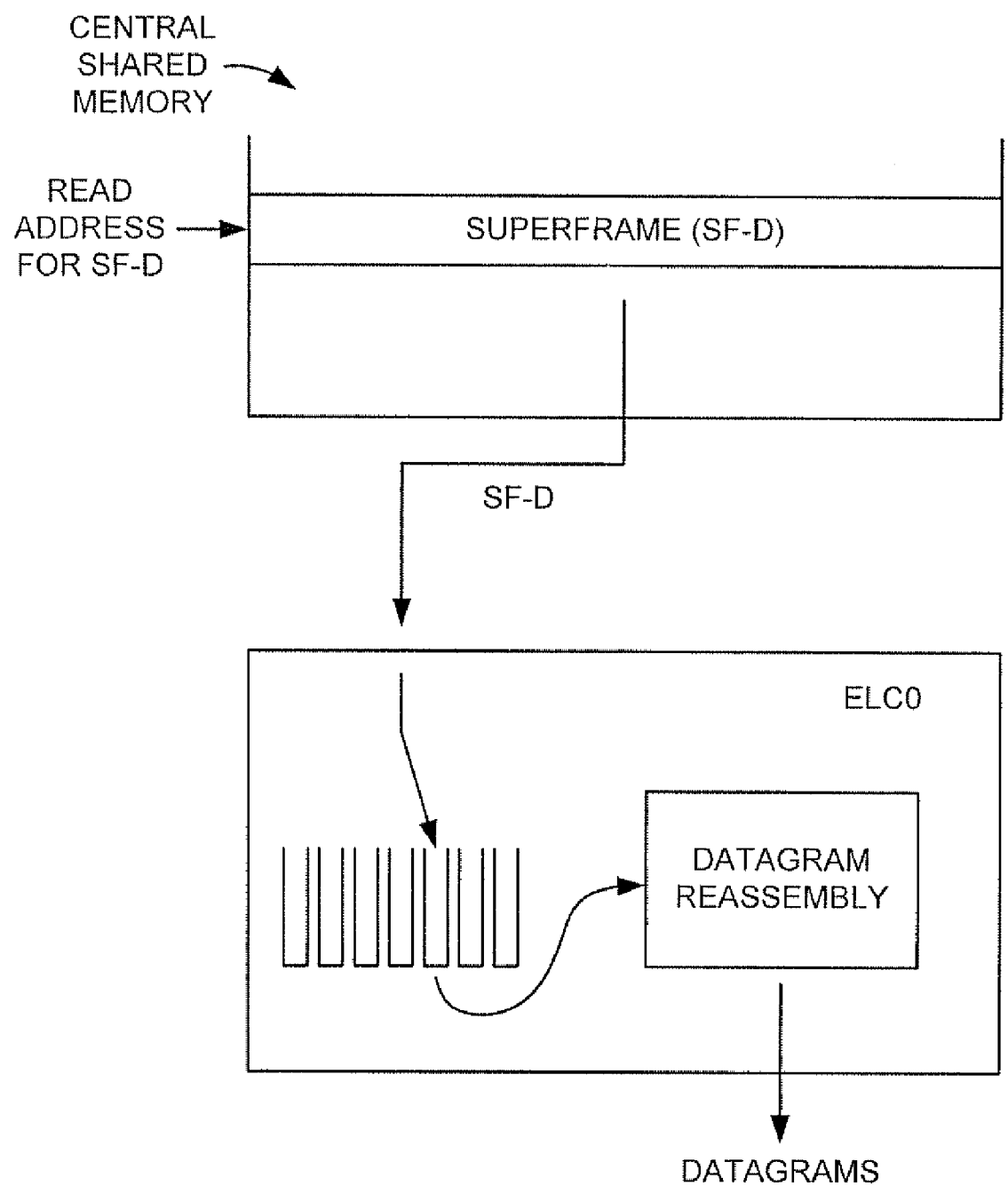
Figure 1:
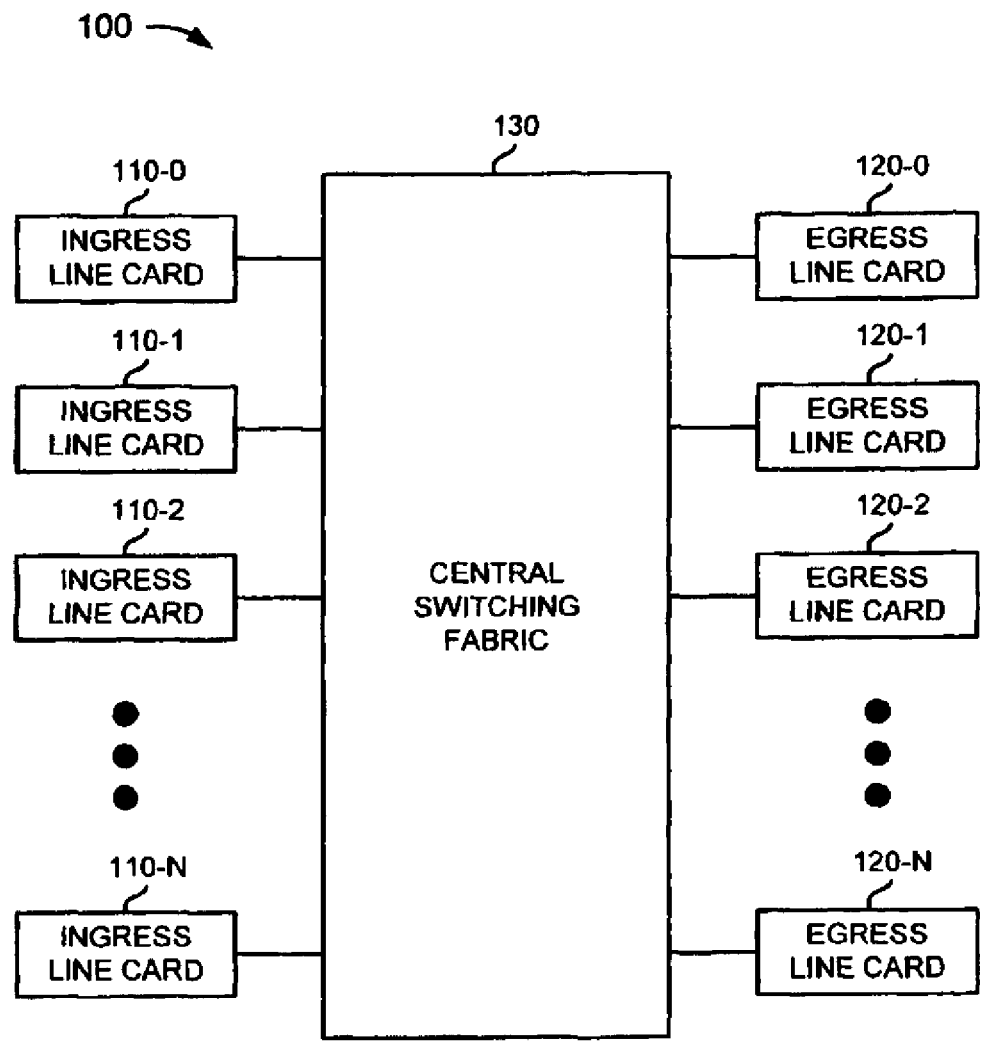
Figure 2:
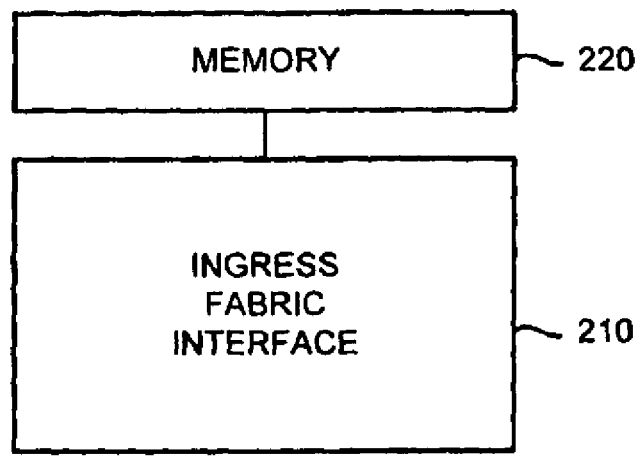
Figure 4:
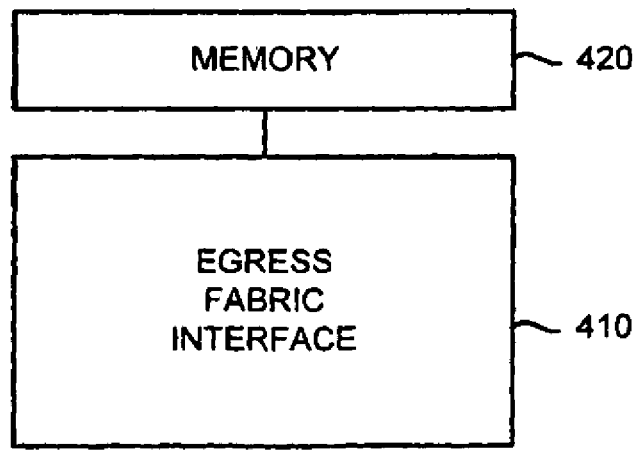
Figure 3:
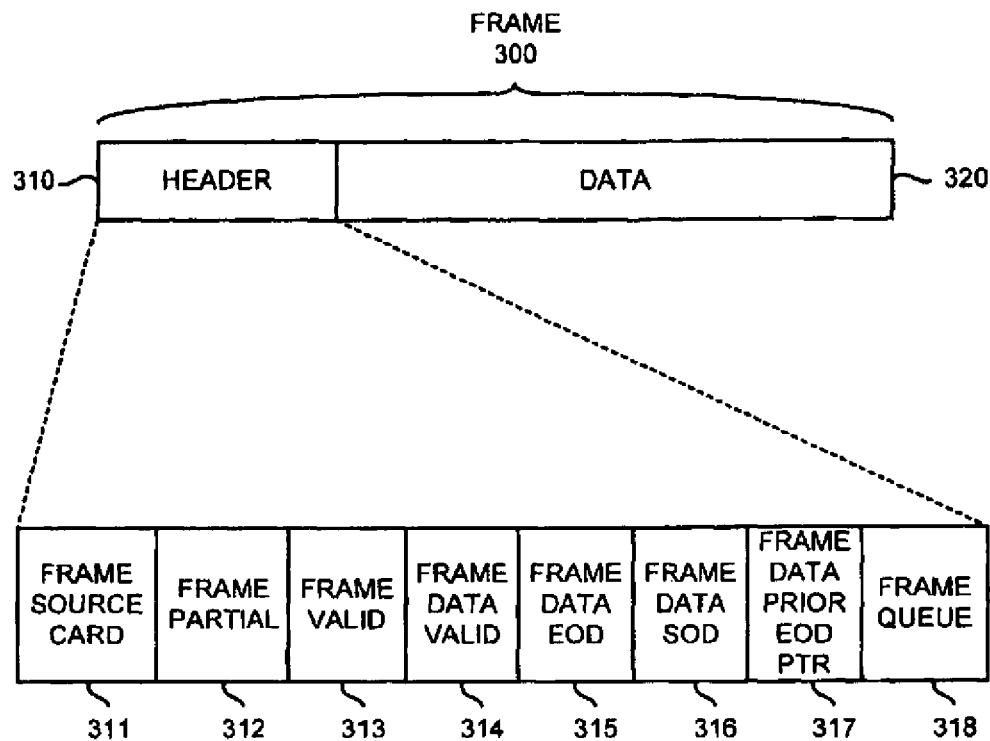
Figure 5:
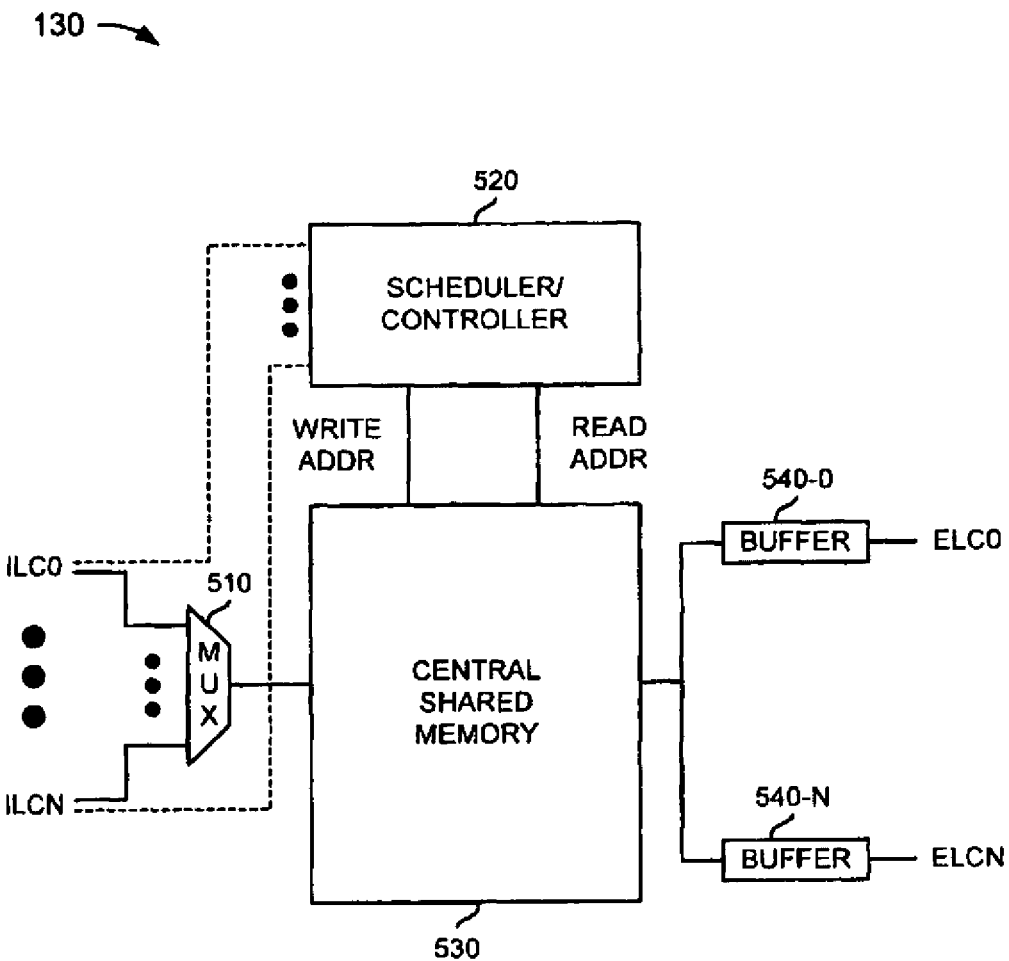
Figure 6:
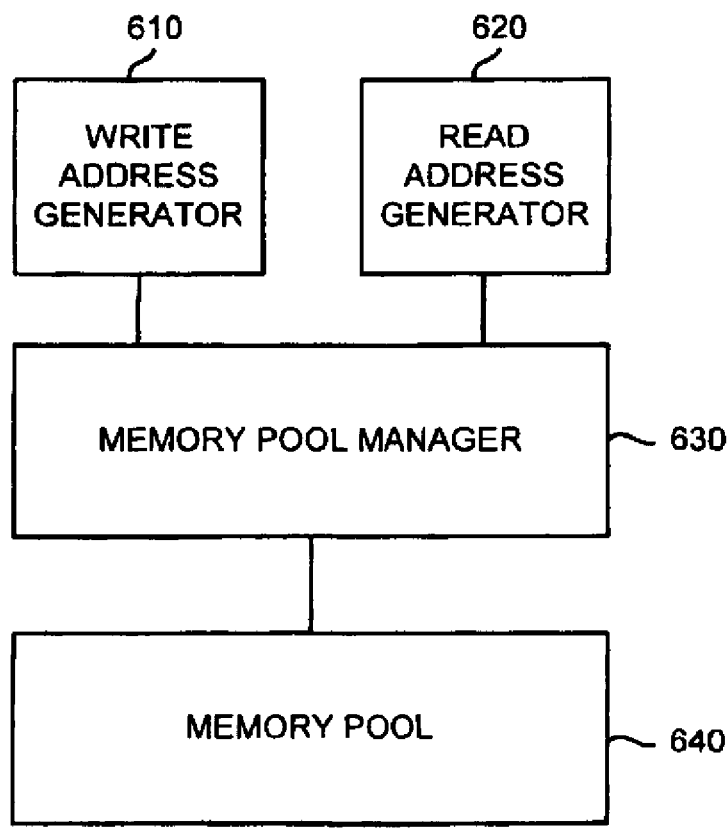
Figure 7:
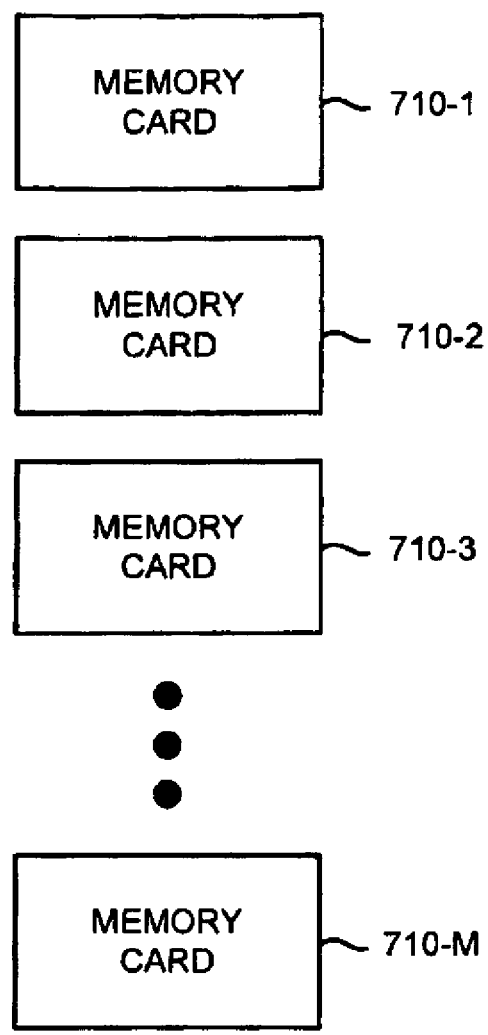
Figure 8:
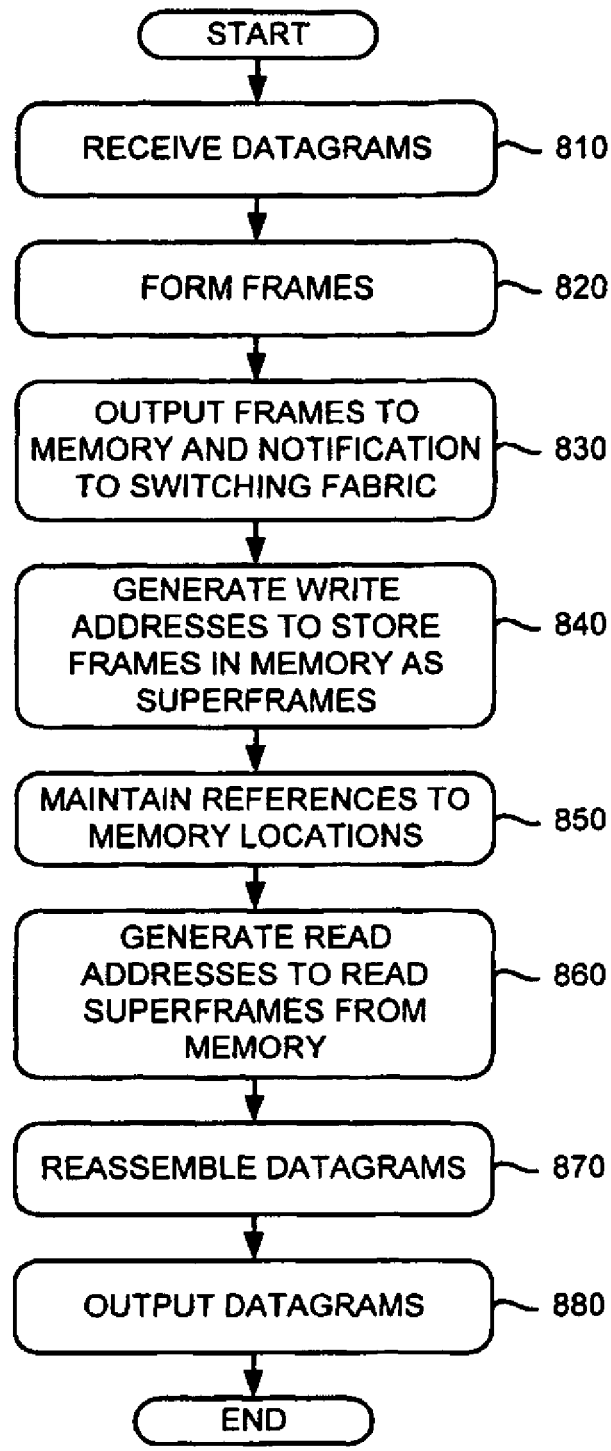
Figure 9:
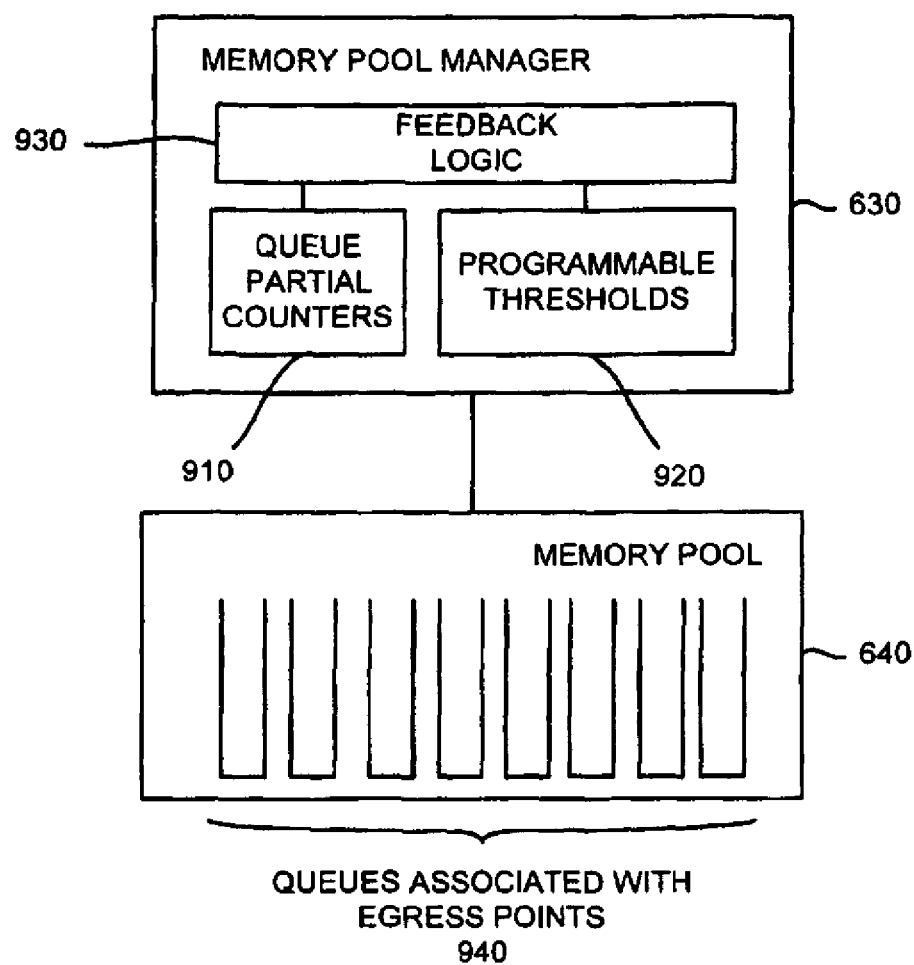
Figure 10:
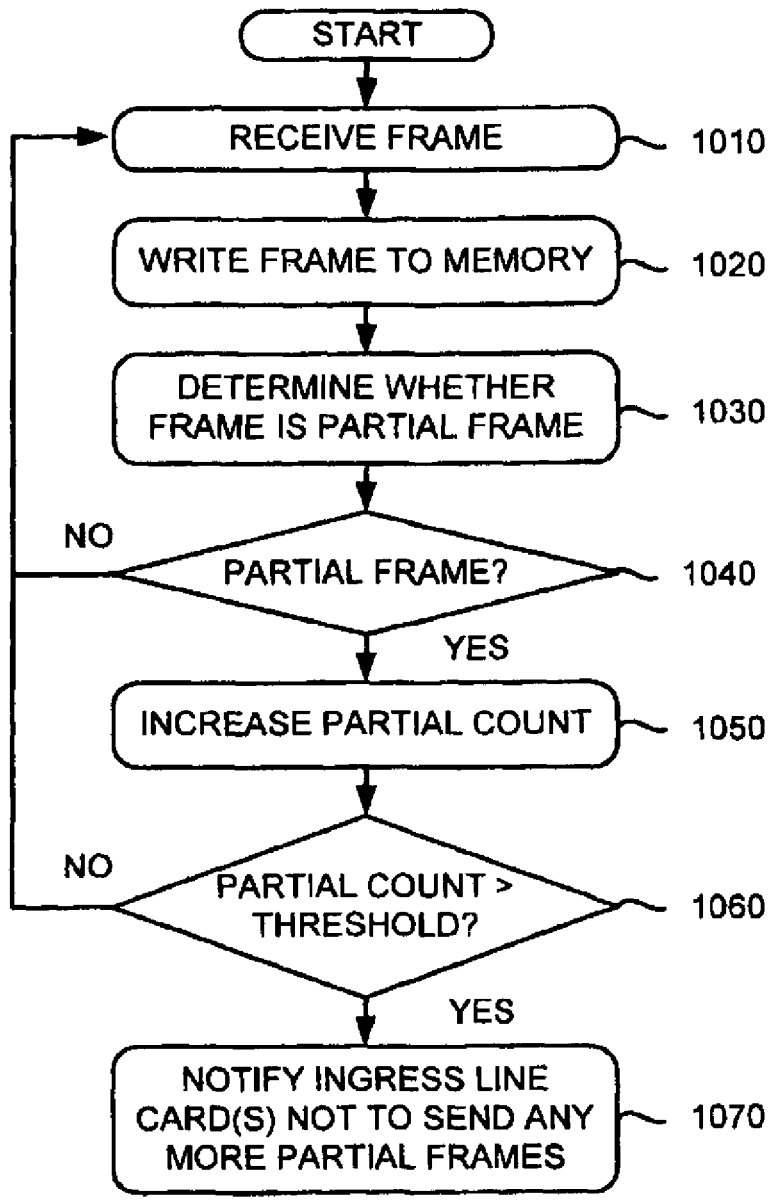
Figure 11:
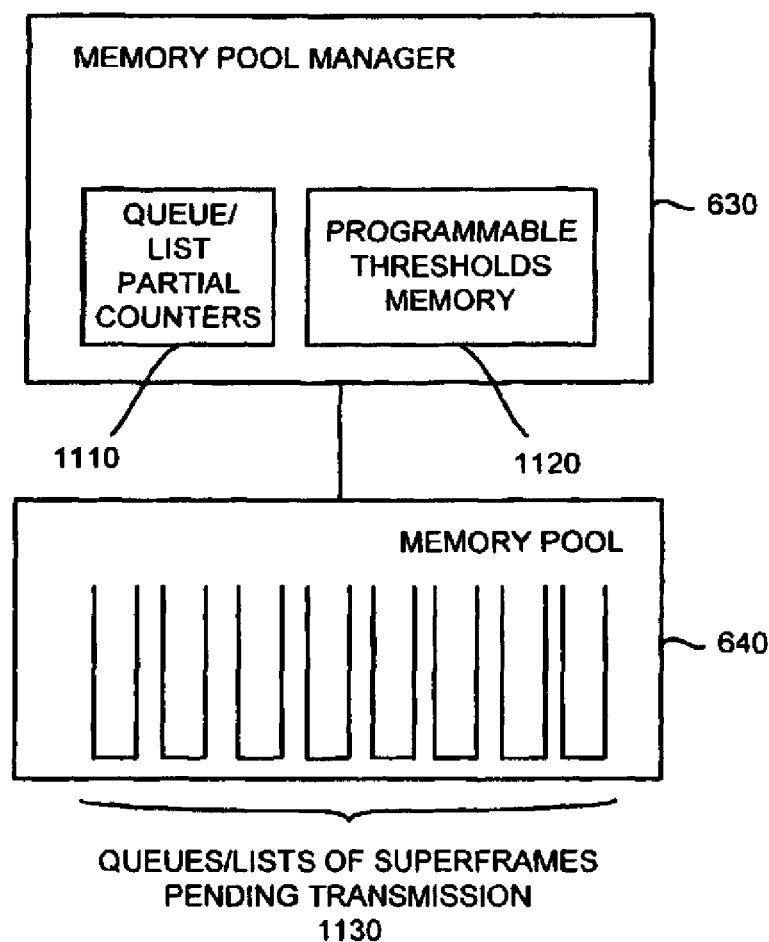
Figure 12:
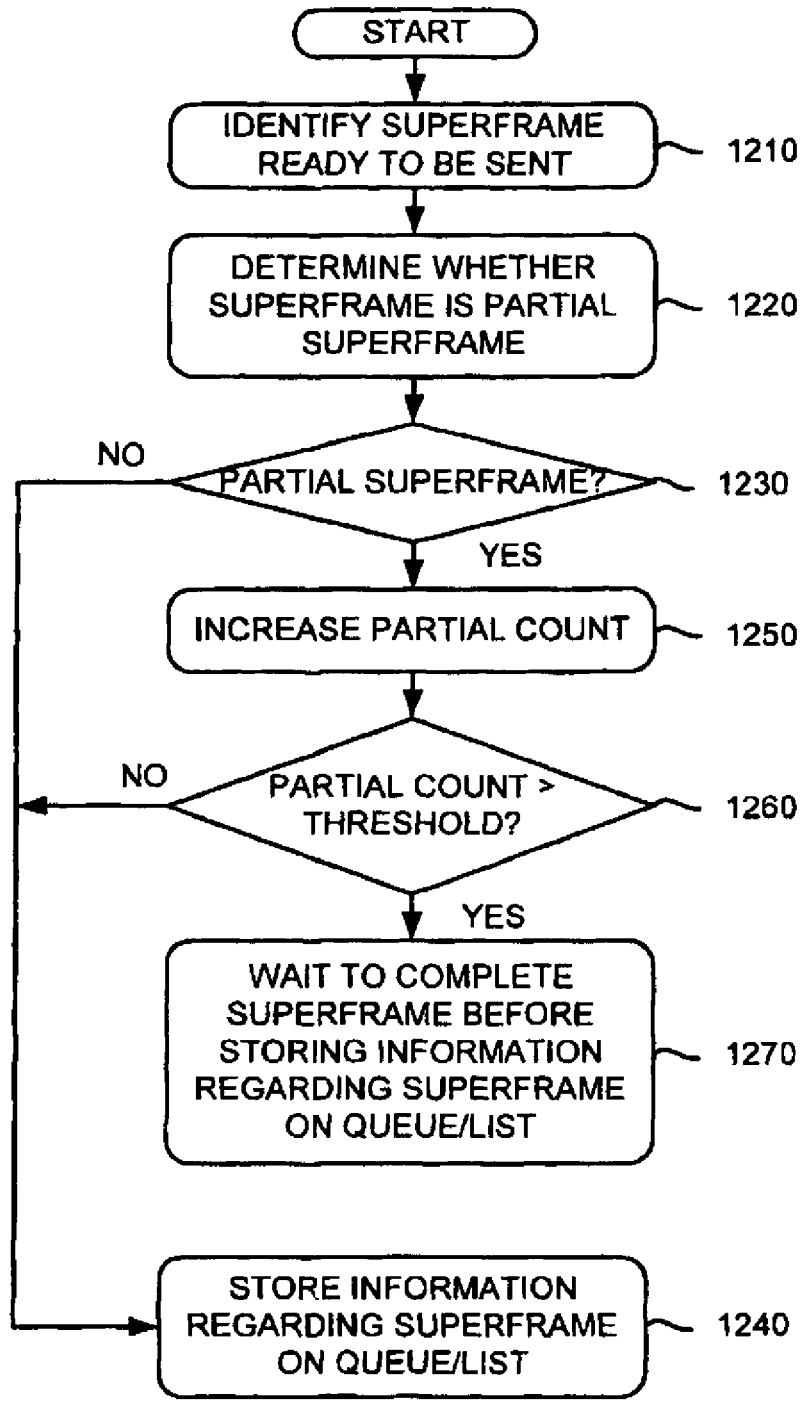
Figure 13:
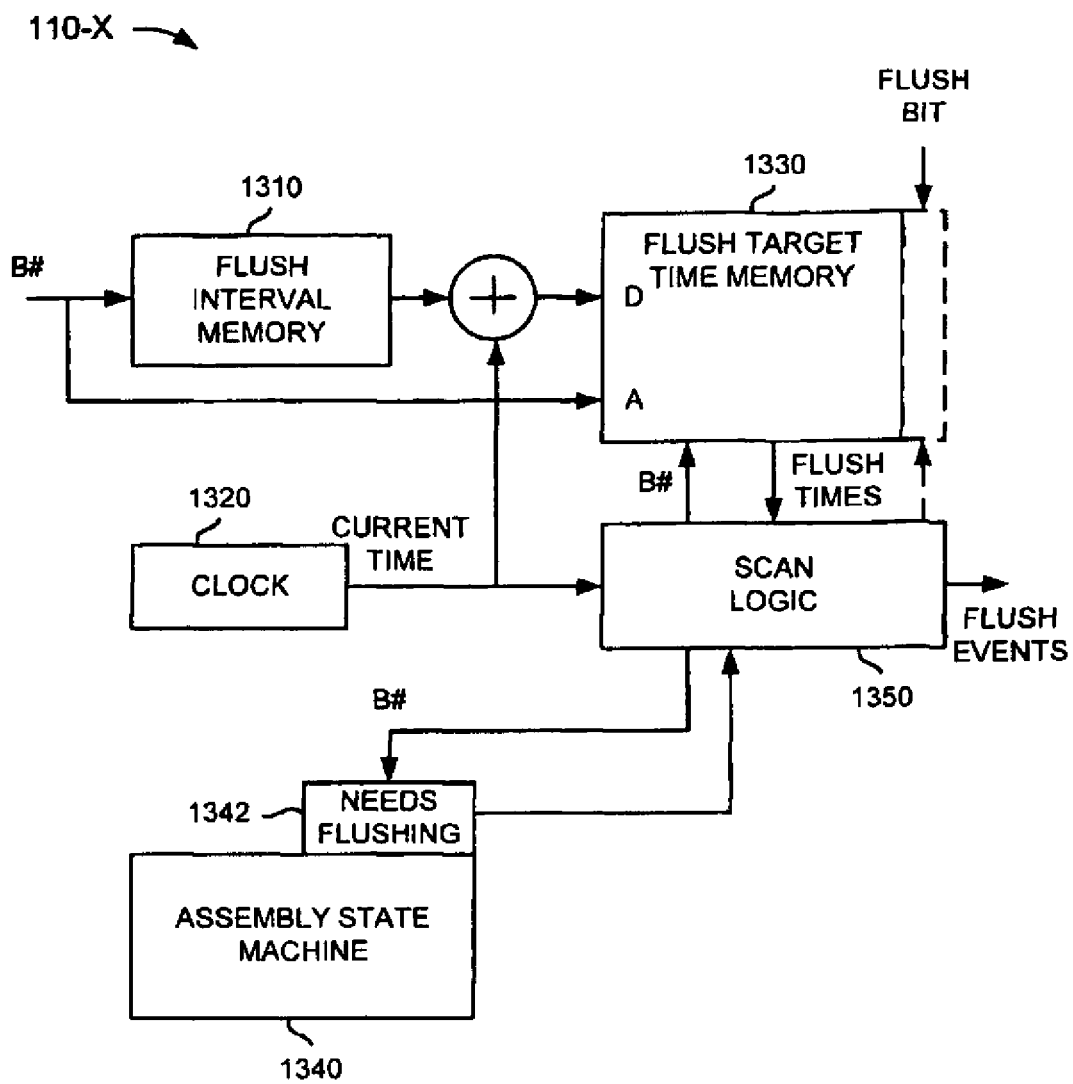
Figure 14:
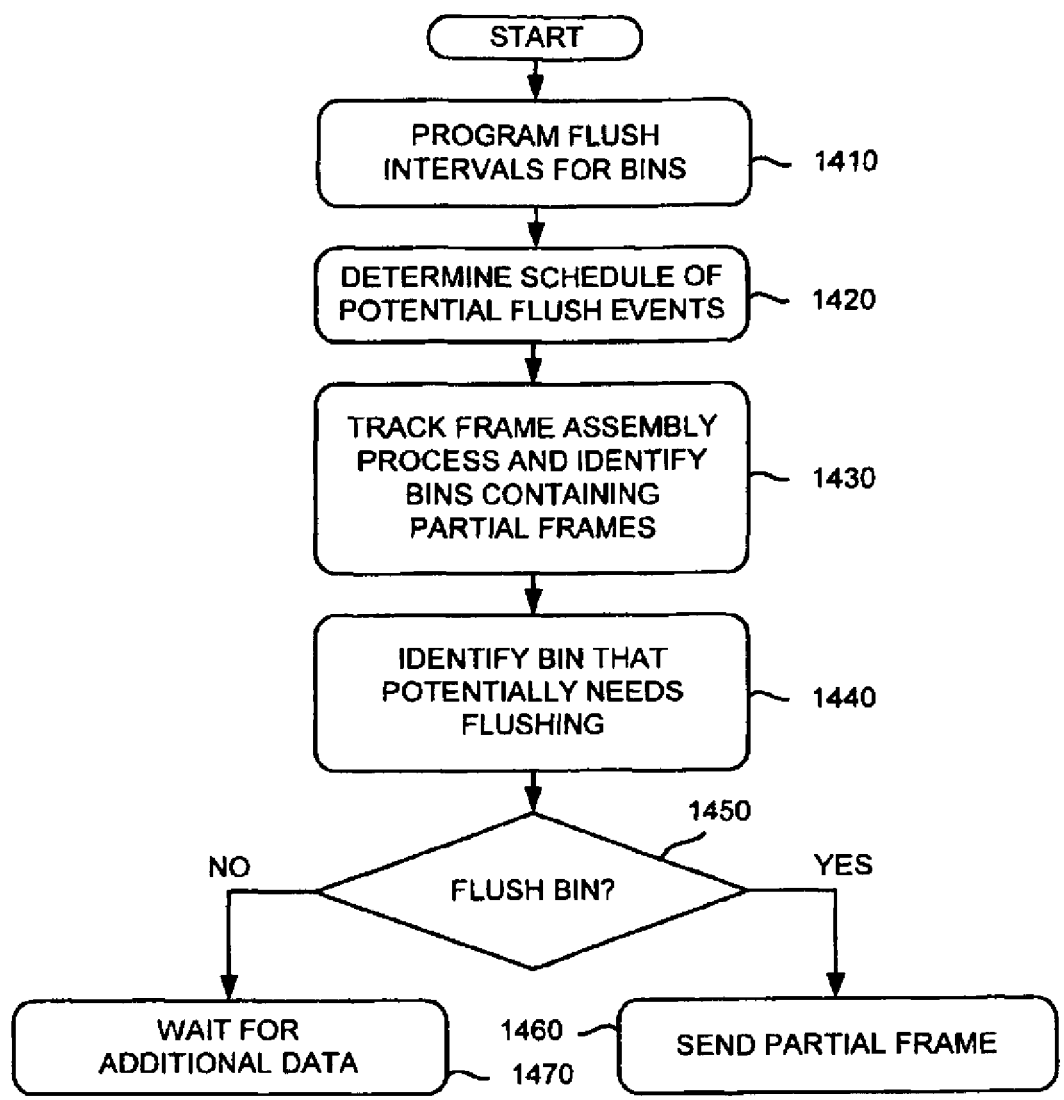

Read addresses may be generated for reading superframes from memory (block 860). In one implementation, a superframe is read from memory every multiple number of a clock cycle (e.g., every 16 clock cycles). As shown in FIG. 13, the memory pool manager within scheduler/controller S/C may identify a queue/list that contains a completed superframe. For example, the memory pool manager might determine that superframe SF-D is the next superframe to be read from memory. The read address generator may generate a read address corresponding to the location in the memory that stores superframe SF-D. As shown in FIG. 14, the read address may be used to cause the memory to output superframe SF-D.

Datagrams may be reassembled from the superframes (block 870). As shown in FIG. 14, egress line card ELC0 may receive superframe SF-D and store it in the appropriate bin. The particular bin in which superframe SF-D is stored may correspond to the egress point associated with superframe SF-D. Egress line card ELC0 may use the data in the bin to reassemble the datagrams. A superframe may include all or a portion of the data associated with a datagram. If the superframe includes all of the data for a datagram, egress line card ELC0 may reassemble the datagram based on this data. If the superframe includes less than all of the data for a datagram, egress line card ELC0 may buffer the data until the rest of the data arrives in a subsequent superframe.

The datagrams may be output on one or more egress links (block 880). As shown in FIG. 14, once egress line card ELC0 reassembles a datagram, it may schedule the datagram for transmission via the appropriate egress link, or links. The datagram may then be output on the egress link, or links.

CONCLUSION

Systems and methods consistent with the principles of the invention may provide a scalable central shared memory switching fabric that may facilitate the transmission of datagrams in an efficient and non-blocking manner. The central shared memory switching fabric may provide these benefits even when implemented by low performance components, such as FPGAs and SRAMs.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 8, the order of the acts may differ in other implementations consistent with the principles of the invention. Also, non-dependent acts may be performed in parallel.

Also, ingress and egress line cards have been described without ingress and egress buffering. In another implementation, the ingress line cards and/or the egress line cards may include such buffering. This buffering may be used by the ingress line cards to hold data when queues of the scheduler/controller exceed a threshold. In this case, the scheduler/controller may send out information on the lengths of its queues to the ingress line cards. In yet another implementation, at least one of the ingress and/or egress line cards may include buffering while at least one other one of the ingress and/or egress line cards may not include such buffering.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise,

What is claimed is:

1. A method performed by a device, comprising:
identifying, via a central switching fabric of the device, a data unit;
determining, via the central switching fabric, that the data unit is a partial data unit, the partial data unit being a data unit that is less than fully filled with data;
increasing, via the central switching fabric, a partial count when the data unit is the partial data unit;
determining, via the central switching fabric, that the increased partial count is greater than a threshold; and
filling, via one or more of a plurality of ingress units associated with the device, a subsequent data unit with data, where the subsequent data unit is filled to form a complete data unit when the partial count is greater than the threshold.

2. The method of claim 1, where the plurality of ingress units connect to the central switching fabric;
the method further comprising:
receiving a stream of datagrams at one of the ingress units;
forming, by the one of the ingress units, the data unit from one or more of the datagrams;
determining, by the one of the ingress units, whether to send the data unit to the central switching fabric as a partial data unit or as a complete data unit; and
sending, by the one of the ingress units, the partial data unit or the complete data unit to the central switching fabric.

3. The method of claim 2, where determining whether to send the data unit includes:
determining that another datagram has been received for the data unit, and
determining that the partial data unit is to be sent to the central switching fabric when no other datagram has been received for the data unit.

4. The method of claim 2, where determining whether to send the data unit includes:
waiting a predetermined amount of time, and
determining that the partial data unit is to be sent to the central switching fabric when the complete data unit has not been formed within the predetermined amount of time.

5. The method of claim 1, where the plurality of ingress units connect to the central switching fabric; and
the method further comprising:
forming the data unit at one of the ingress units; and
sending, by the one of the ingress units, the data unit to the central switching fabric.

6. The method of claim 5, further comprising:
notifying, by the central switching fabric, the one of the ingress units to send no additional partial frames when the partial count is greater than the threshold.

7. The method of claim 6, where filling a subsequent data unit with data to form a complete data unit includes:
  holding, by the one of the ingress units, the subsequent data unit until the subsequent data unit is completely filled with data.

8. The method of claim 5, where determining whether the data unit is the partial data unit includes at least one of:
  checking a field in a header of the data unit sent from the one of the ingress units to determine that the data unit is the partial data unit, or
  checking a notification message sent from the one of the ingress units to determine that the data unit is the partial data unit.

9. The method of claim 1, where increasing a partial count includes:
  maintaining a plurality of partial counters,
  determining one of the partial counters associated with the data unit, and
  increasing the partial count associated with the determined one of the partial counters by one when the data unit is the partial data unit.

10. The method of claim 1, where determining that the partial count is greater than a threshold includes:
  maintaining a plurality of programmable thresholds,
  determining one of the programmable thresholds associated with the data unit, and
  comparing the partial count to the determined one of the programmable thresholds.

11. The method of claim 1, where the data unit is a frame that stores one or more datagrams or a superframe that stores a plurality of frames.

12. The method of claim 1, further comprising:
  storing the partial data unit and the complete data unit in a memory.

13. The method of claim 1, further comprising:
  storing information associated with the partial data unit and the complete data unit in a queue to await transmission.

14. A system, comprising:
  means for determining that a data unit is a partial data unit or a complete data unit, the partial data unit being a data unit that is less than fully filled with data, the complete data unit being a data unit that is fully filled with data;
  means for increasing a partial count when the data unit is the partial data unit;
  means for determining that the partial count is greater than a programmable threshold; and
  means for holding a subsequent data unit until the subsequent data unit is formed into a subsequent complete data unit when the partial count is greater than the programmable threshold.

15. The system of claim 14, further comprising:
  means for forming the data unit, and
  where the means for determining that the data unit is the partial data unit further includes:
  means for checking a field in a header of the data unit to determine that the data unit is the partial data unit, or
  means for checking a notification message sent from the means for forming the data unit to determine that the data unit is the partial data unit.

16. The system of claim 14, where the means for increasing the partial count includes:
  means for maintaining a plurality of partial counters,
  means for determining one of the partial counters associated with the data unit, and
  means for increasing the partial count associated with the determined one of the partial counters by one when the data unit is the partial data unit.

17. The system of claim 14, where the means for determining that the partial count is greater than the programmable threshold includes:
  means for maintaining a plurality of programmable thresholds,
  means for determining one of the programmable thresholds that is associated with the data unit, and
  means for comparing the partial count to the determined one of the programmable thresholds.

18. A device, comprising:
  a set of ingress units, one of the ingress units to:
    receive a plurality of datagrams,
    form a frame from one or more of the datagrams, and
    output the frame, and
  a central switching fabric connected to the ingress units, the central switching fabric to:
    determine whether the frame from the one of the ingress units is a partial frame, the partial frame being a frame that is less than fully filled with data,
    determine that a number of partial frames is greater than a threshold when the frame is the partial frame, and
    notify the one of the ingress units to send complete frames when the number of partial frames is greater than the threshold, where the complete frames are frames that are completely filled with data.

19. The device of claim 18, where when determining whether a number of partial frames is greater than a threshold, the central switching fabric is to:
  maintain a plurality of partial counters,
  maintain a plurality of programmable thresholds,
  identify one of the partial counters and one of the programmable thresholds associated with the partial frame, and
  compare a count value associated with the identified partial counter to a threshold value associated with the identified programmable threshold, and
  determine that the number of partial frames is greater than the threshold when the count value is greater than the threshold value.

20. The device of claim 18, where said one of the ingress units is further to determine whether to send the frame as a partial frame or as a complete frame.

21. The device of claim 20, where said one of the ingress units is further to determine that the partial frame is to be sent to the central switching fabric when no other datagram has been received for the frame.

22. The device of claim 20, where said one of the ingress units is further to:
  wait a particular amount of time, and
  determine that the partial frame is to be sent to the central switching fabric when the complete frame has not been formed within the particular amount of time.

23. The device of claim 18, where notify the one of the ingress units to send complete frames when the number of partial frames is greater than the threshold, the central switching fabric is to notify said one of the ingress units to send no additional partial frames when the partial count is greater than the threshold.

24. The device of claim 18, where the central switching fabric, when determining whether the frame is the partial frame, is further to at least one of:
  check a field in a header of the frame sent from the one of the ingress units, or
  check a notification message sent from the one of the ingress units.

25. A device, comprising:
a set of ingress units, at least one of the ingress units to:
   receive a plurality of datagrams,
   form a frame from one or more of the datagrams, and output the frame;
a set of egress units; and
a central switching fabric connected to the ingress units and the egress units, the central switching fabric to:
   store a plurality of the frames as superframes in a memory,
   identify one of the superframes that is ready to be sent to one of the egress units,
   determine that the identified superframe is a partial superframe, the partial superframe being a superframe that is less than fully filled with frames,
   determine that a number of partial superframes is greater than a threshold, and
complete said identified superframe when the number of partial superframes is greater than the threshold.

26. The device of claim 25, where when determining whether a number of partial superframes is greater than a threshold, the central switching fabric is to:
   maintain a plurality of partial counters,
   maintain a plurality of programmable thresholds,
   identify one of the partial counters and one of the programmable thresholds associated with the partial superframe, and
   compare a count value associated with the identified partial counter to a threshold value associated with the identified programmable threshold, and
   determine that the number of partial superframes is greater than the threshold when the count value is greater than the threshold value.

27. The device of claim 26, where
said central switching fabric is further to maintain a plurality of queues,
one of said plurality of queues is associated with said one of the egress units,
said identified partial counter and said identified programmable threshold are associated with said one of said plurality of queues, and
said one of the egress units is to acquire the identified superframe using information in said one of said plurality of queues.

28. The device of claim 25, where the central switching fabric is further to maintain a queue associated with said one of the egress units, and where said one of the egress units is to acquire the identified superframe using information in said queue.

29. The device of claim 28, where the central switching fabric is further to delay providing said information in said queue to said one of the egress units when completing the identified superframe.

* * * * *

UNITED STATES PATENT AND TRADEMARK OFFICE
CERTIFICATE OF CORRECTION

| | | |
|---|---|---|
| PATENT NO. | : 7,593,330 B1 | Page 1 of 28 |
| APPLICATION NO. | : 11/341438 | |
| DATED | : September 22, 2009 | |
| INVENTOR(S) | : Lipschutz | |

It is certified that error appears in the above-identified patent and that said Letters Patent is hereby corrected as shown below:

The title page, showing an illustrative figure, should be deleted and substitute therefor the attached title page 1 and 2.

Delete drawing sheets 1-13 and substitute therefor the drawing sheets 1-14, consisting of figures 1-15 as shown on the attached pages.

Delete column 1 line 1 through column 14 line 26 and insert column 1 line 1 through column 22 line 14 as attached.

Signed and Sealed this
Eighth Day of February, 2011

David J. Kappos
*Director of the United States Patent and Trademark Office*

(12) United States Patent
Lipschutz

(10) Patent No.: US 7,593,330 B1
(45) Date of Patent: Sep. 22, 2009

(54) PROCESSING OF PARTIAL FRAMES AND PARTIAL SUPERFRAMES

(75) Inventor: David Lipschutz, Lexington, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 585 days.

(21) Appl. No.: 11/341,438

(22) Filed: Jan. 30, 2006

(51) Int. Cl.
H04J 3/14 (2006.01)
H04L 12/26 (2006.01)
H04L 12/54 (2006.01)

(52) U.S. Cl. ............... 370/230; 370/412; 370/429; 370/474

(58) Field of Classification Search ............... 370/230, 370/412, 429, 474
See application file for complete search history.

(56) References Cited

U.S. PATENT DOCUMENTS

| | | | |
|---|---|---|---|
| 4,547,877 A | 10/1985 | Lehman et al. | |
| 5,307,343 A | 4/1994 | Bostica et al. | |
| 5,475,682 A * | 12/1995 | Choudhury et al. | 370/229 |
| 5,541,912 A | 7/1996 | Choudhury et al. | |
| 5,644,577 A * | 7/1997 | Christensen et al. | 370/506 |
| 5,812,527 A * | 9/1998 | Kline et al. | 370/232 |
| 5,936,939 A * | 8/1999 | Des Jardins et al. | 370/229 |
| 6,026,093 A * | 2/2000 | Bellaton et al. | 370/412 |
| 6,400,732 B1 | 6/2002 | Castagna et al. | |
| 6,700,869 B1 | 3/2004 | Falco et al. | |
| 6,888,824 B1 * | 5/2005 | Fang et al. | 370/359 |
| 6,907,473 B2 | 6/2005 | Schmidt et al. | |
| 7,039,067 B2 | 5/2006 | Feinberg et al. | |
| 7,050,440 B2 * | 5/2006 | Colmant et al. | 370/395.1 |
| 7,072,298 B2 * | 7/2006 | Paul et al. | 370/231 |
| 7,149,212 B2 * | 12/2006 | Calvignac et al. | 370/360 |
| 7,369,496 B1 * | 5/2008 | Wiggins et al. | 370/235 |
| 7,372,864 B1 * | 5/2008 | Reast et al. | 370/428 |
| 7,385,965 B2 * | 6/2008 | McCormick et al. | 370/355 |
| 7,415,031 B2 * | 8/2008 | Primrose et al. | 370/419 |
| 2002/0010891 A1 | 1/2002 | Klein | |
| 2002/0114335 A1 | 8/2002 | Namura | |
| 2002/0196778 A1 * | 12/2002 | Colmant et al. | 370/352 |
| 2005/0025141 A1 * | 2/2005 | Chao et al. | 370/386 |
| 2005/0073956 A1 * | 4/2005 | Moores et al. | 370/235 |

(Continued)

OTHER PUBLICATIONS

David Lipschutz et al.; U.S. Appl. No. 11/221,700; entitled "Scalable Central Memory Switching Fabric"; filed Sep. 9, 2005; 43 pages.

*Primary Examiner*—Alpus H Hsu
(74) *Attorney, Agent, or Firm*—Harrity & Harrity, LLP

(57) ABSTRACT

A system determines when to send out a partial data unit or when to complete a data unit before sending it. The system may identify a data unit, determine whether the data unit is a partial data unit, increase a partial count when the data unit is the partial data unit, determine whether the partial count is greater than a threshold, and fill a subsequent data unit with data to form a complete data unit when the partial count is greater than the threshold. The system may, alternatively or additionally, determine a schedule of flush events for a queue, identify whether the queue includes information associated with a partial data unit, identify whether the queue should be flushed based on the schedule of flush events and whether the queue includes information associated with the partial data unit, wait for additional data when the queue should not be flushed, and send out the partial data unit when the queue should be flushed.

29 Claims, 14 Drawing Sheets

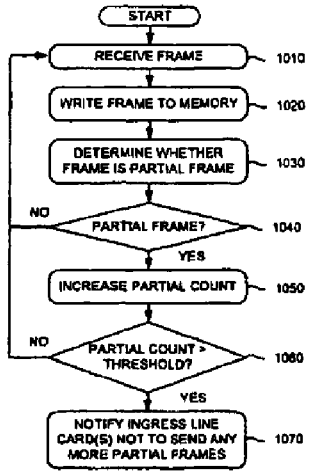

US 7,593,330 B1
Page 2

U.S. PATENT DOCUMENTS

| | | | |
|---|---|---|---|
| 2005/0088969 A1* | 4/2005 | Carlsen et al. | 370/229 |
| 2006/0106946 A1* | 5/2006 | Agarwal et al. | 709/250 |
| 2006/0221945 A1* | 10/2006 | Chin et al. | 370/381 |

* cited by examiner

US 7,593,330 B1

PROCESSING OF PARTIAL FRAMES AND PARTIAL SUPERFRAMES

BACKGROUND

1. Field of the Invention

Implementations consistent with the principles of the invention relate generally to data communication and, more particularly, to the processing of partial frames and partial superframes in a data transfer device.

2. Description of Related Art

A typical shared memory switching architecture includes input and output ports connected via a shared memory switching fabric. Typically, a shared memory switching architecture is used only when the desired aggregate system bandwidth can be achieved using a memory data width equal to or less than a cell size (for cell systems) or a minimum packet size (for packet systems). The shared memory switching architecture sometimes includes multiple memory subsystems. In this case, statistical or hash-based load balancing may be used between the memory subsystems. These approaches can be blocking and/or slower than wire speed.

For high bandwidth systems, lightly buffered or unbuffered cross-point architectures are typically used. These architectures often include delay-bandwidth buffer memory at the ingress and egress line cards. As a result, the memory bandwidth of the system is reduced to that of the line card instead of that of the entire system. With the cross-point architecture, each packet is written and read twice at each of the line cards. Therefore, the total system memory bandwidth required is double that of a shared memory switching architecture. Further, cross-point architectures typically have significant blocking characteristics on a port-to-port basis when there are many sub-ports (streams) per line card.

SUMMARY

According to one aspect, a method may include identifying a data unit; determining whether the data unit is a partial data unit, the partial data unit being a data unit that is less than fully filled with data; increasing a partial count when the data unit is the partial data unit; determining whether the partial count is greater than a threshold; and filling a subsequent data unit with data to form a complete data unit when the partial count is greater than the threshold.

According to another aspect, a method may include determining a schedule of flush events for a queue; identifying whether the queue includes information associated with a partial data unit, the partial data unit being a data unit that is less than completely filled with data; identifying whether the queue should be flushed based on the schedule of flush events and whether the queue includes information associated with the partial data unit; waiting for additional data when the queue should not be flushed; and sending out the partial data unit when the queue should be flushed.

BRIEF DESCRIPTION OF THE DRAWINGS

Figure 15:
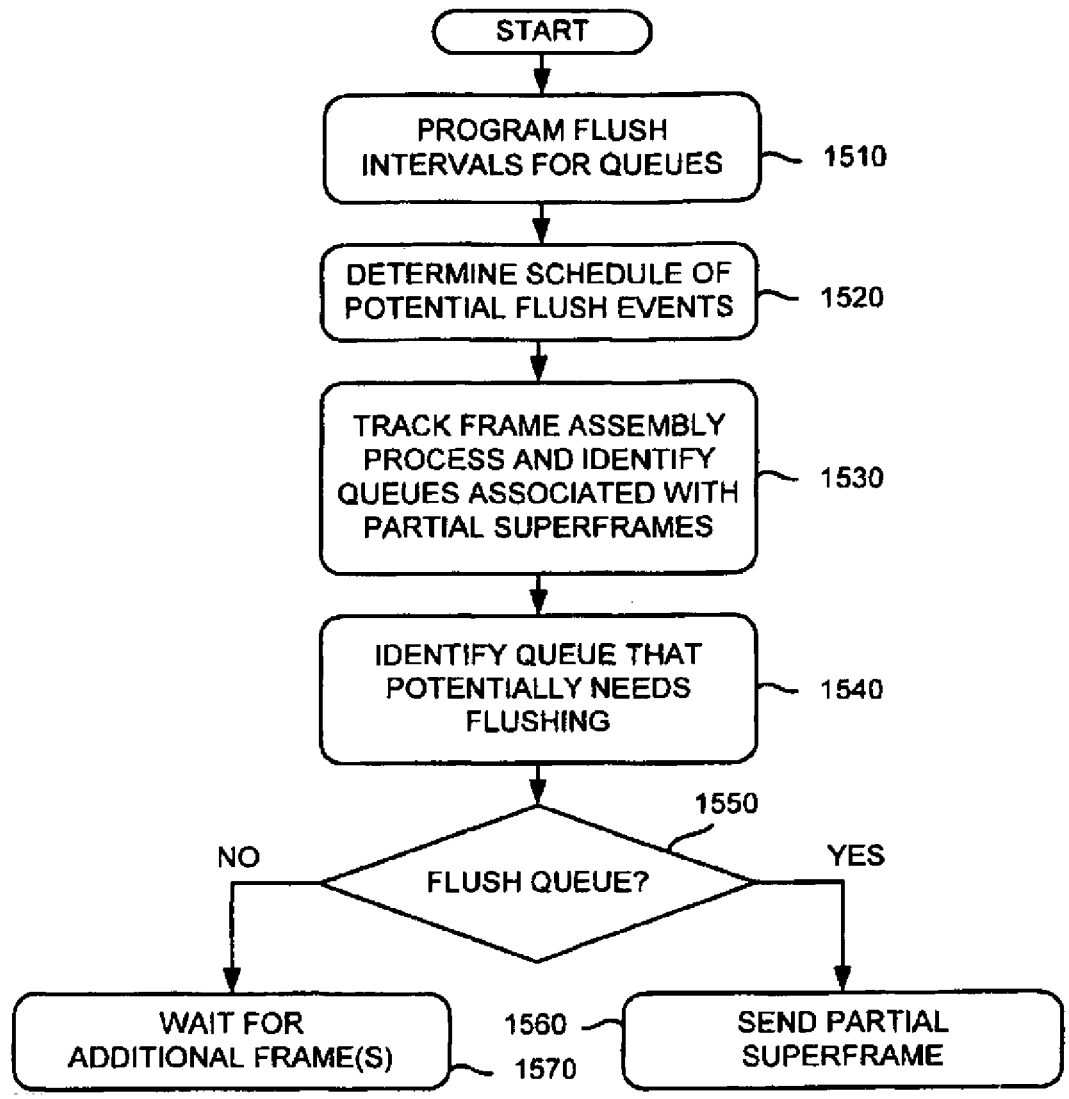

The accompanying drawings, which are incorporated in and constitute a part of this specification, illustrate an embodiment of the invention and, together with the description, explain the invention. In the drawings, FIG. 1 is an exemplary diagram of a device in which systems and methods consistent with the principles of the invention may be implemented;

FIG. 2 is an exemplary block diagram of a portion of an ingress line card of FIG. 1 according to an implementation consistent with the principles of the invention;

FIG. 3 an exemplary diagram of a frame according to an implementation consistent with the principles of the invention;

FIG. 4 is an exemplary diagram of a portion of the egress line card of FIG. 1 according to an implementation consistent with the principles of the invention;

FIG. 5 is an exemplary diagram of a portion of the central switching fabric of FIG. 1 according to an implementation consistent with the principles of the invention;

FIG. 6 is an exemplary diagram of a portion of the scheduler/controller of FIG. 5 according to an implementation consistent with the principles of the invention;

FIG. 7 is an exemplary diagram of a portion of the memory of FIG. 5 according to an implementation consistent with the principles of the invention;

FIG. 8 is a flowchart of an exemplary operation for processing datagrams according to an implementation consistent with the principles of the invention;

FIG. 9 is an exemplary diagram of a portion of the scheduler/controller of FIG. 5 for processing partial frames;

FIG. 10 is a flowchart of an exemplary operation for processing partial frames according to an aspect of a first implementation consistent with the principles of the invention;

FIG. 11 is an exemplary diagram of a portion of the scheduler/controller of FIG. 5 for processing partial superframes;

FIG. 12 is a flowchart of an exemplary operation for processing partial superframes according to an aspect of a first implementation consistent with the principles of the invention;

FIG. 13 is an exemplary diagram of a portion of an ingress line card of FIG. 1 for processing partial frames;

FIG. 14 is a flowchart of an exemplary operation for processing partial frames according to an aspect of a second implementation consistent with the principles of the invention; and FIG. 15 is a flowchart of an exemplary operation for processing partial superframes according to an aspect of a second implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the principles of the invention relate to a central shared memory switching fabric. When there is plenty of ingress traffic, bandwidth and latency are not really an issue. When there is not plenty of ingress traffic, however, issues arise regarding how long to hold onto data and when to send out partial data, as will be described later. The act of sending out partial data will be referred to as "flushing." Implementations described herein may determine when flushing should occur and when flushing should not occur.

EXEMPLARY DEVICE

FIG. 1 is an exemplary diagram of a device 100 in which systems and methods consistent with the principles of the invention may be implemented. In one implementation, device 100 may correspond to a data transfer device, such as a router, a switch, a gateway, a bridge, or the like. Device 100 may include a set of ingress line cards 110-1 through 110-N (collectively referred to as "ingress line cards 110"), a set of egress line cards 120-1 through 120-N (collectively referred to as "egress line cards 120"), and a central switching fabric 130.

While FIG. 1 shows that device 100 includes separate sets of ingress line cards 110 and egress line cards 120, the functions of an ingress line card and an egress line card may be implemented within a single line card. In other words, a single line card may include ingress line card functionality as well as egress line card functionality. In another implementation, ingress line cards 110 and egress line cards 120 may be physically separate line cards and may differ in number. For example, there may be more or fewer ingress line cards 110 than egress line cards 120. In either implementation, ingress line cards 110 and egress line cards 120 may connect to central switching fabric via wired, wireless, and/or optical connections.

Ingress line cards 110 may include input units that receive streams of datagrams on ingress links and make the datagrams available to central switching fabric 130. A "datagram," as used herein, may refer to any type or form of data, including packet and non-packet data. Some of ingress line cards 110 may differ in speed and/or bandwidth. For example, a first ingress line card that connects to the core of a network, such as the Internet, may include more speed and/or bandwidth than a second ingress line card that connects to the edge of the network. In this case, the first ingress line card may include more ingress links (that may possibly be bound together as a single stream) than the second ingress line card.

FIG. 2 is an exemplary block diagram of a portion of ingress line card 110-0 according to an implementation consistent with the principles of the invention. Other ones of ingress line cards 110 may include the same or similar components.

As shown in FIG. 2, ingress line card 110-0 may include an ingress fabric interface 210 and a memory 220. Ingress fabric interface 210 may include a field programmable gate array (FPGA) or an application specific integrated circuit (ASIC). Ingress fabric interface 210 may receive streams of datagrams over one or more ingress links and generate frames based on the datagrams.

A frame may be thought of as a container that includes a fixed amount of data associated with one or more datagrams. In one implementation, a frame is 64 bytes in length. In another implementation, a frame is 256 bytes in length. In yet another implementation, a frame may have a length different from 64 or 256 bytes. A frame may be larger, smaller, or the same size as a datagram. Because the datagrams may differ in size, a frame may be larger than some datagrams, smaller than other datagrams, and the same size as yet other datagrams.

Ingress fabric interface 210 may pack datagrams into frames without regard to the beginnings and endings of the datagrams. In other words, the datagrams need not be aligned with the start and end of the frame. A frame may be filled quickly or gradually as datagrams arrive on the ingress link(s). In some instances, ingress fabric interface 210 may determine that a frame should be sent out before being completely filled with data from one or more datagrams. A frame that is not completely filled with data may be referred to as a "partial" frame.

FIG. 3 is an exemplary diagram of a frame 300 according to an implementation consistent with the principles of the invention. Frame 300 may include a header portion 310 and a data portion 320. Header portion 310 may be generated by ingress fabric interface 210 (FIG. 2). Header portion 310 may be passed along with frame 300 within device 100 and may be used to reassemble the datagrams at egress line cards 120. In one implementation, header portion 310 is not used by central switching fabric 130, but is simply forwarded by central switching fabric 130 along with frame 300.

As shown in FIG. 3, header portion 310 may include frame source card field 311, frame partial field 312, frame valid field 313, frame data valid field 314, frame data end of datagram (EOD) field 315, frame data start of datagram (SOD) field 316, frame data prior EOD pointer (PTR) field 317, and frame queue field 318. In other implementations, header portion 310 may contain more, fewer, or different pieces of information.

Frame source card field 311 may identify the ingress line card that generated frame 300. Frame queue field 318 may identify a queue with which frame 300 is associated. As described below, the queue may be associated with a particular egress point of device 100. Frame source card field 311 and frame queue field 318 may be used for reassembly by an egress line card.

Frame partial field 312 may indicate whether frame 300 is complete. In some situations, it may be beneficial for an ingress line card to output a frame that is not completely filled with data from one or more datagrams. When frame partial field 312 indicates that frame 300 is not complete, then data portion 320 may be less than filled with data from one or more datagrams.

Frame valid field 313 may indicate whether frame 300 is valid. Frame data valid field 314 may indicate whether data portion 320 of frame 300 is completely empty. Frame data EOD field 315 may identify where the end of a datagram occurs within data portion 320. Frame data SOD field 316 may identify where the start of a datagram occurs within data portion 320. Frame data EOD field 315 and frame SOD field 316 may be used to identify a break between datagrams in frame 300 and identify where this break occurs. Frame data prior EOD pointer field 317 may indicate whether frame 300 contains one complete datagram.

Data portion 320 may store data associated with one or more datagrams. When data portion 320 stores data associated with multiple datagrams, the data may be packed together with no holes or gaps between them and without regard to the beginnings and endings of the datagrams. In other words, data portion 320 may store all or part of an entire datagram and may store parts of two or more datagrams.

Returning to FIG. 2, ingress fabric interface 210 may accumulate data for frames and when a frame is ready to be sent out (whether complete or partial), it may output the frame and a notification. The notification may inform central switching fabric 130 (FIG. 1) that ingress line card 110-0 is outputting a frame. The notification may include information that identifies the egress point with which the frame is associated and may possibly indicate whether the frame is a complete or partial frame. An egress point may correspond to an egress link or port of an egress line card or some finer granularity, such as a class of traffic, a priority of traffic, a weight assigned to particular traffic or a particular link or port, etc.

Memory 220 may include a memory device, such as a SRAM. Memory 220 may include a number of bins (e.g., queues) to store datagrams for frames. In one implementation, memory 220 may include a bin for each egress point. Memory 220 may accumulate datagrams for a particular egress point in a corresponding bin until a frame is ready to be sent out. At this point, ingress fabric interface 210 may generate and output the frame.

Returning to FIG. 1, egress line cards 120 may include egress units that receive superframes from central switching fabric 130, reassemble datagrams from the superframes, and make the datagrams available to egress links. A superframe may be considered a container that includes a fixed number of frames, equal to or greater than two frames. In one implementation, a superframe includes sixteen frames. In another implementation, a superframe may include more or fewer frames.

Similar to ingress line cards 110, some of egress line cards 120 may differ in speed and/or bandwidth. For example, a first egress line card that connects to the core of a network, such as the Internet, may include more speed and/or bandwidth than a second egress line card that connects to the edge of the network. In this case, the first egress line card may include more egress links (that may possibly be bound together as a single stream) than the second egress line card.

FIG. 4 is an exemplary block diagram of a portion of egress line card 120-0 according to an implementation consistent with the principles of the invention. Other ones of egress line cards 120 may include the same or similar components.

As shown in FIG. 4, egress line card 120-0 may include an egress fabric interface 410 and a memory 420. Egress fabric interface 410 may include a FPGA or an ASIC. Egress fabric interface 410 may receive superframes, reassemble datagrams from the superframes, and make the datagrams available to egress links. Egress fabric interface 410 may use information in the headers of the frames within the superframes to identify datagram portions that belong to the same datagrams. For example, egress fabric interface 410 may use information in frame source card field 311 and frame queue field 318 (FIG. 3) to identify the particular datagram with which a frame is associated. Based on this information, egress fabric interface 410 may reassemble the datagrams and output the datagrams on one or more egress links.

In some situations, egress fabric interface 410 may receive a superframe that is not completely filled with frames. A superframe that is not completely filled with frames may be referred to as a "partial" superframe. When reassembling datagrams, egress fabric interface 410 may discard empty frames in partial superframes.

Memory 420 may include a memory device, such as a SRAM. Memory 420 may include a number of bins (e.g., queues) to store data associated with datagrams. In one implementation, memory 420 may include a bin for each egress point and ingress point combination. An ingress point may correspond to an ingress link or port of an ingress line card or some finer granularity, such as a class of traffic, a priority of traffic, a weight assigned to particular traffic or a particular link or port, etc. Therefore, memory 420 may have a larger memory requirement than memory 220 (FIG. 2) of ingress line cards 110. Memory 420 may accumulate data associated with datagrams for a particular egress point and ingress point combination in a corresponding bin until all of the data is collected and the datagram can be reassembled. At this point, egress fabric interface 410 may output the datagram on an egress link.

Returning to FIG. 1, central switching fabric 130 may be implemented on a circuit card. Alternatively, there might be multiple planes of central switching fabrics 130 implemented on one or more circuit cards. Generally, central switching fabric 130 may store frames as superframes and schedule their transmission via egress line cards 120.

FIG. 5 is an exemplary diagram of a portion of central switching fabric 130 according to an implementation consistent with the principles of the invention. As shown in FIG. 5, central switching fabric 130 may include a multiplexer 510, a scheduler/controller (S/C) 520, a central shared memory 530, and a set of buffers 540-0 through 540-N (collectively referred to as "buffers 540").

Multiplexer 510 may receive frames (complete or partial) from ingress line cards 110 and forward them to memory 530. In one implementation, multiplexer 510 may be controlled to select certain frames to forward to memory 530. For example, S/C 520 may control multiplexer 510 to forward a frame at substantially the same time that S/C 520 outputs a write address corresponding to that frame. Alternatively, multiplexer 510 may select frames to forward according to a schedule, such as a round robin schedule.

S/C 520 may include a FPGA or an ASIC. S/C 520 may operate as a master bookkeeper for memory 530. S/C 520 may receive notifications from ingress line cards 110 when ingress line cards 110 send frames to multiplexer 510. S/C 520 may generate write addresses for storing the frames in memory 530 and read addresses for reading superframes from memory 530.

FIG. 6 is an exemplary diagram of a portion of S/C 520 according to an implementation consistent with the principles of the invention. As shown in FIG. 6, S/C 520 may include a write address generator 610, a read address generator 620, a memory pool manager 630, and a memory pool 640. Write address generator 610 may determine and generate write addresses for storing frames as superframes in memory 530. Read address generator 620 may determine and generate read addresses for reading superframes from memory 530.

Memory pool manager 630 may control the generation of write and read addresses by write address generator 610 and read address generator 620, respectively. Memory pool manager 630 may also track the addresses at which superframes are stored in memory 530. Memory pool manager 630 may track these addresses in queues of references to memory locations within memory 530 that contain data that needs to be sent to egress line cards 120. As described below, these queues may be maintained within memory pool 640.

Memory pool manager 630 may store frames associated with the same egress point together in the same superframe in memory 530. Memory pool manager 630 may allocate a buffer representing the superframe to a queue associated with the egress point and track how complete the superframe is (e.g., how many frames have been stored with regard to the superframe). With the arrangement described herein, it does not matter whether the superframe gets filled in gradually over time from a single ingress line card or all at once from multiple, possibly all, ingress line cards.

When memory pool manager 630 determines that the superframe is ready to be sent out (whether complete or partial), memory pool manager 630 may enqueue it into a queue or list of superframes that are pending transmission via a particular egress point. Because the superframe is bigger, possibly many times bigger, than a frame, memory pool manager 630 may have several clock cycles to identify the next superframe to be read from memory 530. Memory pool manager 630 may service each of the queues or lists of superframes equally (e.g., according to a round robin schedule). When priorities, weights, etc. are associated with the queues/lists, it may take memory pool manager 630 several clock cycles to determine which superframe is to be read next.

Memory pool 640 may include a memory device, such as a SRAM. Memory pool 640 may maintain a number of queues to store references to locations in memory 530. Memory pool 640 may also maintain a number of lists or queues of superframes ready to be sent (whether complete or partial). At a minimum, memory pool 640 may include one queue/list for each of egress line cards 120. In practice, however, memory pool 640 may include multiple queues/lists for each of egress line cards 120. For example, a queue/list may be set up to correspond to an output port of an egress line card 120, a class of traffic on the output port, a priority associated with the class of traffic on the output port, or some finer or other degree of granularity.

The queues/lists may be set up as point to point (a single ingress point to a single egress point), point to multi-point (a single ingress point to multiple egress points), multi-point to point (multiple ingress points to a single egress point), or multi-point to multi-point (multiple ingress points to multiple egress points). In the point to point case, a queue/list may be set up to store information (e.g., references to locations in memory 530 or information regarding superframes ready to be sent) associated with frames from a single ingress point destined for a single egress point. In the point to multi-point case, a queue/list may be set up to store information (e.g., references to locations in memory 530 or information regarding superframes ready to be sent) associated with frames from a single ingress point destined for multiple egress points. In the multi-point to point case, a queue/list may be set up to store information (e.g., references to locations in memory 530 or information regarding superframes ready to be sent) associated with frames from multiple ingress points destined for a single egress point. In the multi-point to multi-point case, a queue/list may be set up to store information (e.g., references to locations in memory 530 or information regarding superframes ready to be sent) associated with frames from multiple ingress points destined for multiple egress points.

The queues/lists may be maintained as linked lists within memory pool 640. This allows flexibility in the size of any particular queue/list and the location at which an item for the queue/list is stored within memory pool 640. For each queue/list, memory pool 640 may include a head pointer that identifies the top of the queue/list, a tail pointer that identifies the bottom of the queue/list, and for each item in the queue/list, a pointer to the next item in the queue/list. Memory pool 640 may also track how many items are in each queue/list.

Returning to FIG. 5, memory 530 may store frames as superframes. Memory 530 may contain sufficient bandwidth to write from all ingress line cards 110. As a result, there is no congestion at multiplexer 510.

FIG. 7 is a diagram of a portion of memory 530 according to an implementation consistent with the principles of the invention. As shown in FIG. 7, memory 530 may include a set of memory cards 710-1 through 710-M (collectively referred to as "memory cards 710"). Each of memory cards 710 may include a memory device, such as a SRAM or DRAM. The actual number of memory cards 710 included in memory 530 may be based on one or more network parameters (e.g., the throughput of device 100, the amount of network traffic traversing device 100, etc.). The bandwidth of memory 530 can be increased by adding one or more additional memory cards 710. Memory cards 710 may function as a logical memory device with a single read address, a single write address, and a wide data input/output.

One of memory cards 710 may be used as a backup memory. For example, this memory card may include an exclusive OR (XOR) of the data in the other memory cards. Therefore, when a memory card fails, the backup memory card can be used to recreate the data in the failed memory card and it can be hot swapped with the failed memory card.

Returning to FIG. 5, buffers 540 may include rate-matching memory devices, such as first-in, first-out (FIFO) memories. The read bandwidth of memory 530 may be much larger than the bandwidth that can be accepted by or that is desired by egress line cards 130. Buffers 540 may adjust the rate to that handled by egress line cards 130. It may also be desirable to include rate-matching memory devices on the ingress side between ingress line cards 110 and memory 530 (not shown).

EXEMPLARY PROCESSING

FIG. 8 is a flowchart of an exemplary operation for processing datagrams according to an implementation consistent with the principles of the invention. Processing may begin with the receipt of datagrams on ingress links (block 810). For example, an ingress line card 110-X (where X=0, ..., N) may receive a stream of datagrams. Ingress line card 110-X may store the datagrams in bins based on the egress points with which the datagrams are intended. The bins may be considered frame containers that may be equal in size to the size of a frame.

Frames may be formed based on the datagrams (block 820). For example, ingress line card 110-X may track the fullness of the bins. When ingress line card 110-X determines that a frame is ready to be sent (whether complete or partial), regardless of the beginning and ending of any datagram within the bin, ingress line card 110-X may form a frame based on the data in the bin. For example, ingress line card 110-X may generate a header portion 310 (FIG. 3) and pack the data from the bin into a data portion 320 of a frame.

The frames and notifications may be output to central switching fabric 130 (block 830). For example, ingress line card 110-X may output a frame (whether complete or partial) and a notification. The notification may inform central switching fabric 130 that a frame has been (or is being) output by ingress line card 110-X.

Write addresses may be generated for storing the frames in memory 530 as superframes (block 840). In one implementation, a frame may be stored in memory 530 every clock cycle. Scheduler/controller (S/C) 520 may receive the notification from ingress line card 110-X. Write address generator 610 may generate a write address for storing the frame in memory 530. The frame may be stored within a superframe in memory 530.

References to the locations in memory 530 that the superframes are stored may be maintained (block 850). For example, memory pool manager 630 may store a reference to the location at which the superframe containing the frame is stored in memory 530 in one of several queues. The particular queue in which the reference is stored may correspond to the egress point associated with the superframe.

Read addresses may be generated for reading superframes from memory 530 (block 860). In one implementation, a superframe is read from memory 530 every multiple number of clock cycles (e.g., every 16 clock cycles). Memory pool manager 630 within S/C 520 may identify a queue/list that contains a superframe ready to be sent. Read address generator 620 may generate a read address corresponding to the location in memory 530 that stores a superframe that is ready to be sent. The read address may be used to cause memory 530 to output a superframe (complete or partial).

Datagrams may be reassembled from the superframes (block 870). For example, an egress line card 120-X may receive a superframe and store it in the appropriate bin. The particular bin in which a superframe is stored may correspond to the egress point associated with the superframe. Egress line card 120-X may use the data in the bin to reassemble the datagrams. A superframe may include all or a portion of the data associated with a datagram. If the superframe includes all of the data for a datagram, egress line card 120-X may reassemble the datagram based on this data. If the superframe includes less than all of the data for a datagram, egress line card 120-X may buffer the data until the rest of the data arrives in a subsequent superframe. If the superframe contains empty frames and/or partial frames, egress line card 120-X may discard empty frames and/or empty portions of a partial frame.

The datagrams may be output on one or more egress links (block 880). For example, once egress line card 120-X reassembles a datagram, it may schedule the datagram for transmission via the appropriate egress link, or links. The datagram may then be output on the egress link, or links.

PARTIAL FRAMES AND PARTIAL SUPERFRAMES

When there is plenty of ingress traffic, there is practically no need to send partial frames or partial superframes. In practice, however, ingress traffic is sometimes less than plentiful. In this case, decisions need to be made whether and how long to wait for additional data to fill a frame or superframe. The act of sending out a partial frame or partial superframe will be referred to as "flushing" (i.e., emptying the bin/queue/list storing a partial frame or partial superframe or information associated with a partial frame or partial superframe). Various implementations for making the flushing decision will be described below. The implementations described below may be used alone or in combination.

First Implementation—Partial Frames

This aspect of the first implementation deals with flushing with regard to partial frames. In this implementation, the flushing decision may be made by S/C 520 (FIG. 5) within central switching fabric 130 (FIG. 1).

FIG. 9 is an exemplary diagram of a portion of S/C 520 for processing partial frames. As shown in FIG. 9, S/C 520 may include memory pool manager 630 and memory pool 640. Memory pool manager 630 may include queue partial counters 910, programmable thresholds memory 920, and feedback logic 930. Queue partial counters 910 may track the number of partial frames on queues. As explained above, a queue may be associated with an egress point and track how complete the associated superframe is (e.g., how many frames have been stored with regard to the superframe). A separate counter within queue partial counters 910 may be associated with a each of the different queues.

Programmable thresholds memory 920 may store programmable thresholds for the queues. The thresholds may be used in connection with the number of partial frames stored on the queues to determine when ingress line cards 110 are permitted to send partial frames and when ingress line cards 110 can no longer send partial frames, as described in more detail below. A typical value for a threshold might be one or more.

Feedback logic 930 may monitor the number of partial frames stored on the queues and determine when the number of partial frames stored on a particular queue exceeds the threshold associated with that queue. When the number of partial frames exceeds the threshold, feedback logic 930 may notify all of ingress line cards 110 that are feeding that queue (i.e., ones of the ingress line cards 110 that are sending frames associated with the egress point corresponding to the queue) to stop sending any partial frames.

Memory pool 640 may store queues 940 associated with the egress points. Memory pool manager 630 may process information in queues 940 when making its flushing decisions. As explained above, queues 940 may be set up as point to point, point to multi-point, multi-point to point, and multi-point to multi-point. In one implementation, queues 940 may be maintained as linked lists within memory pool 640.

FIG. 10 is a flowchart of an exemplary operation for processing partial frames according to an aspect of a first implementation consistent with the principles of the invention. In this implementation, the processing of FIG. 10 may be performed by S/C 520 (FIG. 5). In another implementation, at least some of the processing may be performed by a component other than S/C 520.

As described above, an ingress line card 110-X may receive a stream of datagrams. Ingress line card 110-X may store the datagrams in bins based on the egress points with which the datagrams are intended. Ingress line card 110-X may form frames based on the datagrams. When ingress line card 110-X determines that a frame is ready to be sent (whether complete or partial), ingress line card 110-X may send the frame and a notification to central switching fabric 130. Ingress line card 110-X may determine that a frame is ready to be sent when no additional datagram has been received for the frame. This decision may be as quick as the time it takes for ingress line card 110-X to determine whether another datagram has been received (i.e., virtually no waiting time) or a programmable amount of wait time.

The frame may be received (and/or identified) by the central switching fabric 130 and written to memory 530 (blocks 1010 and 1020). For example, scheduler/controller (S/C) 520 may receive the notification from ingress line card 110-X and generate a write address for storing the frame in memory 530. The frame may be stored within a superframe in memory 530.

It may be determined whether the frame is a partial frame (block 1030). Information that identifies the frame as a partial frame or a complete frame may be stored in the header of the frame and/or included in the notification provided by ingress line card 110-X. For example, the header of the frame may be checked to determine whether a field in the header (e.g., frame partial field 312 in FIG. 3) indicates that the frame is a partial frame. Alternatively, or additionally, the notification provided by ingress line card 110-X may be checked to determine whether it contains information indicating that the frame is a partial frame. There may be no distinction between degrees of fullness of a frame. The frame may be either complete or partial.

If the frame is not a partial frame (block 1040—NO), then processing may return to block 1010 to process the next frame that is received. If the frame is a partial frame (block 1040—YES), then the partial count associated with the queue corresponding to the egress point associated with the frame may be increased (block 1050). For example, memory pool manager 630 may identify the appropriate one of queue partial counters 910 and increment the count by one.

It may then be determined whether the partial count exceeds the programmable threshold associated with the queue (block 1060). For example, memory pool manager 630 may read the threshold associated with the queue from programmable thresholds memory 920 and compare the threshold value to the count value associated with the queue in queue partial counters 910. If the partial count does not exceed the threshold associated with the queue (block 1060—NO), then processing may return to block 1010 to process the next frame that is received.

If the partial count exceeds the threshold associated with the queue (block 1060—YES), then ingress line card(s) 110 that are sending frames for that queue may be notified not to send any more partial frames (block 1070). For example, feedback logic 930 may notify those ingress line card(s) 110 to send only complete frames and no partial frames. As a result, the notified ingress line card(s) 110 may hold onto its/their frames until they are complete before sending them out. This may relieve device 100 (FIG. 1) from any further latency hit than that which is already caused by the partial frames already stored in central switching fabric 130.

At some point, ingress line card(s) 110 may be notified that they can start sending partial frames again. For example, when the partial count no longer exceeds the threshold associated with the queue, ingress line card(s) 110 may be notified that they can resume sending partial frames.

This type of arrangement may have the following advantages: it improves the utilization of memory within central switching fabric 130 and it assures that proper bandwidth flows to egress line cards 120.

First Implementation—Partial Superframes

This aspect of the first implementation deals with flushing with regard to partial superframes. In this implementation, the flushing decision may be made by S/C 520 (FIG. 5) within central switching fabric 130 (FIG. 1).

FIG. 11 is an exemplary diagram of a portion of S/C 520 for processing partial superframes. As shown in FIG. 11, S/C 520 may include memory pool manager 630 and memory pool 640. Memory pool manager 630 may include queue/list partial counters 1110 and programmable thresholds memory 1120. Queue/list partial counters 1110 may track the number of partial superframes on the queues/lists. As explained above, a queue/list may be maintained for superframes ready to be sent to a particular egress line card or some finer degree of granularity. A separate counter within queue/list partial counters 1110 may be associated with each of the different queues/lists.

Programmable thresholds memory 1120 may store programmable thresholds for the queues/lists. The thresholds may be used in connection with the number of partial superframes stored on the queues/lists to determine when additional partial superframes can be sent to egress line cards and when no additional partial superframes can be sent, as described in more detail below. A typical value for a threshold might be one or more.

Memory pool 640 may store queues/lists 1130 of superframes that are pending transmission to egress line cards 120. Memory pool manager 630 may process information in queues/lists 1130 when making its flushing decisions. As explained above, queues/lists 1130 may be set up as point to point, point to multi-point, multi-point to point, and multi-point to multi-point. In one implementation, queues/lists 1130 may be maintained as linked lists within memory pool 640.

FIG. 12 is a flowchart of an exemplary operation for processing partial superframes according to an aspect of a first implementation consistent with the principles of the invention. In this implementation, the processing of FIG. 12 may be performed by S/C 520 (FIG. 5). In another implementation, at least some of the processing may be performed by a component other than S/C 520.

As described above, frames may be stored in memory as superframes. A partial superframe may be a superframe that is not completely filled with frames. A superframe may be identified as ready to be sent (block 1210). A superframe may be identified as ready to be sent when no additional frame has been received for the superframe. This decision may be as quick as the time it takes to determine whether another frame has been received (i.e., virtually no waiting time) or a programmable amount of wait time.

It may be determined whether the superframe is a partial superframe (block 1220). As explained above, memory pool manager 630 may track how complete a superframe is. Memory pool manager 630 may use this information to determine whether the superframe is complete or partial. There may be no distinction between degrees of fullness of a superframe. The superframe may be either complete or partial.

If the superframe is not a partial superframe (block 1230—NO), then information regarding the superframe may be stored on the queue/list associated with egress line card 120-X (or a finer degree of granularity, such as an output port of egress line card 120-X, a class of traffic on the output port, a priority associated with the class of traffic on the output port, or some finer or other degree of granularity) associated with the superframe (block 1240). If the superframe is a partial superframe (block 1230—YES), then the partial count associated with the queue/list corresponding to egress line card 120-X (or a finer degree of granularity) associated with the superframe may be increased (block 1250). For example, memory pool manager 630 may identify the appropriate one of queue/list partial counters 1110 and increment the count by one.

It may then be determined whether the partial count exceeds the programmable threshold associated with the queue/list (block 1260). For example, memory pool manager 630 may read the threshold associated with the queue/list from programmable thresholds memory 1120 and compare the threshold value to the count value associated with the queue/list in queue/list partial counters 1110. If the partial count does not exceed the threshold associated with the queue/list (block 1260—NO), then information regarding the superframe may be stored on the queue/list associated with egress line card 120-X (or a finer degree of granularity) associated with the superframe (block 1240).

If the partial count exceeds the threshold associated with the queue/list (block 1260—YES), then the superframe may be held until it can be completed (i.e., filled with frames) (block 1270). After the superframe is completed, information regarding the superframe may be stored on the queue/list associated with egress line card 120-X (or a finer degree of granularity) associated with the superframe. This may relieve device 100 (FIG. 1) from any further latency hit than that which is already caused by the partial superframes already pending transmission by central switching fabric 130.

At some point, central switching fabric 130 may start sending partial superframes again. For example, when the partial count no longer exceeds the threshold associated with the queue/list, central switching fabric 130 may resume sending partial superframes.

This type of arrangement may have the following advantages: it improves the utilization of memory within central switching fabric 130 and it assures that proper bandwidth flows to egress line cards 120.

Second Implementation—Partial Frames

This aspect of the second implementation deals with flushing with regard to partial frames. In this implementation, the flushing decision may be made by individual ones of ingress line cards 110 (FIG. 1).

FIG. 13 is an exemplary diagram of a portion of an ingress line card 110-X for processing partial frames. As shown in FIG. 13, ingress line card 110-X may include flush interval memory 1310, clock 1320, flush target time memory 1330, assembly state machine 1340, and scan logic 1350. Flush interval memory 1310 may store a programmable flush interval (or flush time) for each bin (e.g., queue) maintained by ingress line card 110-X. As explained above, a bin may be

13 associated with each egress point. Flush interval memory 1310 may receive a bin number as input and output the flush interval for that bin.

Clock 1320 may generate a current time value. In one implementation, the current time values generated by clock 1320 may periodically repeat. In this case, clock 1320 may be implemented as a circular counter. Flush target time memory 1330 may store a flush target time value, as a schedule of a potential flush event, for each bin. The flush target time value for a bin may be a combination of the flush interval for the bin from flush interval memory 1310 and the current time value from clock 1320. The flush target time value for a bin may represent a time at which the bin is scheduled to be flushed (i.e., a partial frame is scheduled to be sent out). If the frame gets completed before this time, then no flushing will take place.

Assembly state machine 1340 may include a master state machine that keeps track of the frame assembly process. Assembly state machine 1340 may track whether a bin is empty, completely filled (i.e., contains a complete frame), or partially filled (i.e., contains a partial frame). Assembly state machine 1340 may include a lookaside buffer called a "needs flushing" buffer 1342. Needs flushing buffer 1342 may include a one bit wide memory addressable by bin number that indicates whether the corresponding bin stores a partial frame.

Scan logic 1350 may periodically identify flush events based on the information in needs flushing buffer 1342, the flush target time values in flush target time memory 1330, and the current time value from clock 1320. Scan logic 1350 may determine whether additional processing time should be used to complete a partial frame in a bin or whether the bin should be flushed (by generating a flush event). When a bin has been flushed, scan logic 1350 may store information indicating that the bin has been flushed (e.g., a flush bit) in flush target time memory 1330.

FIG. 14 is a flowchart of an exemplary operation for processing partial frames according to an aspect of a second implementation consistent with the principles of the invention. Flush intervals for each of the bins maintained by an ingress line card 110-X may be programmed (block 1410). If ingress line card 110-X waits to complete its frame, central switching fabric 130 and egress line cards 120 will be more fully utilized, but latency will also increase. If ingress line card 110-X sends partial frames, some bandwidth will be lost and the amount of bandwidth that is lost may be a function of time.

Consider a stream of frames that has a periodic pattern similar to:

|---- F ----|---- F ----|---- F ----|---- F ----|---- P ----|
|------------------------- n -------------------------| where "F" refers to a full (complete) frame, "P" refers to a partial frame, and n refers to the interval between repetitions of the partial frames. Therefore, the series of full frames may be represented by:

$$\frac{n-1}{n}.$$

14

Assume that there is some overspeed in central switching fabric 130:

$$\frac{n-1}{n}O = 1,$$

which indicates how often in the stream of frames, device 100 can afford to have a partial frame.

Assume that there are k ingress points and any of the k ingress points can provide a partial frame. In this case, the interval at which any one of the k ingress points can provide a partial frame may be represented by:

$$n = \frac{O}{O-1}.$$

where a typical value of O might be 1.1 (i.e., 10% overspeed). If $$n = \frac{O}{O-1} = 11,$$

then a partial frame may be sent every 11 frame intervals. Considering k ingress points, then n=11 k . By choosing an appropriate overspeed for device 100, it can be determined based on the above equations how much time to hold a partial frame and when to send out a partial frame. A tradeoff may be made of how much bandwidth to waste versus how much latency can be tolerated. It may be beneficial to program short flush intervals for low latency sensitive traffic (e.g., voice traffic) and long flush intervals for ordinary traffic. This information may be stored for each bin in flush interval memory 1310.

A schedule of potential flush events may be determined for each of the bins (block 1420). For example, the flush interval for a bin may be added to the current time value generated by clock 1320 to determine a flush target time value for the bin. As explained above, the flush target time value for the bin may indicate the time at which the bin is scheduled to be flushed.

The frame assembly process may be tracked and any bins containing partial frames may be identified (block 1430). For example, assembly state machine 1340 may monitor the assembly of frames in the bins and identify bins that contain partial frames in needs flushing buffer 1342.

A bin that potentially needs flushing may be identified (block 1440). For example, scan logic 1350 may identify a bin that potentially needs flushing based on information in needs flushing buffer 1342. Scan logic 1350 may use a bin number associated with the bin to query needs flushing buffer 1342. Scan logic 1350 may also use the bin number to query flush target time memory to identify the flush target time value associated with the bin.

Scan logic 1350 may use the information from needs flushing buffer 1342, the flush target time value, and the current time value to determine whether the bin actually needs flushing. For example, if the information in needs flushing buffer 1342 indicates that the bin stores a partial frame and the flush target time value matches (or exceeds) the current time value, then scan logic 1350 may determine that the bin needs flushing.

15

If the bin needs flushing (block 1450—YES), then a partial frame may be sent from the bin (block 1460). In this case, scan logic 1350 may generate a flush event associated with the bin which may instruct or cause the bin to send out the partial frame. Scan logic 1350 may also store an indicator (e.g., a flush bit) in flush target time memory 1330 that a flush event has occurred for the bin. If the bin does not need flushing (block 1450—NO), then the bin may wait for additional data for the frame it is assembling (block 1470). In this case, scan logic 1350 may generate no flush event for the bin. This may be taken as an indication to wait for additional data. The waiting may result in a complete frame being assembled or a partial frame being sent out at a later time.

This type of arrangement may have the following advantages: it improves the utilization of memory within central switching fabric 130 and it assures that proper bandwidth flows to egress line cards 120. It may also reduce the need for notifications to stop sending partial frames from central switching fabric 130 to ingress line cards 110.

Second Implementation—Partial Superframes

This aspect of the second implementation deals with flushing with regard to partial superframes. In this implementation, the flushing decision may be made by central switching fabric 130 (FIG. 5).

In this implementation, central switching fabric 130 may include components similar to those described with regard to FIG. 13. These components may be located within S/C 520 or elsewhere within central switching fabric 130. In this case, however, flush interval memory 1310, flush target time memory 1330, assembly state machine 1340, and scan logic 1350 may store or process information with regard to queues maintained by S/C 520 instead of bins maintained by ingress line cards 110. As explained above, a queue may be associated with an egress point and track how complete the associated superframe is.

FIG. 15 is a flowchart of an exemplary operation for processing partial superframes according to an aspect of a second implementation consistent with the principles of the invention. Flush intervals for each of the queues maintained by S/C 520 may be programmed (block 1510). If S/C 520 waits to complete its superframes, the memory in central switching fabric 130 and egress line cards 120 will be more fully utilized, but latency will also increase. If S/C 520 sends partial superframes, some bandwidth will be lost and the amount of bandwidth that is lost may be a function of time.

Consider a stream of superframes that has a periodic pattern similar to:

|---- F ----|--- F ----|---- F ---|--- F ----|--- P ----|
|------------------------- n ------------------------| where "F" refers to a full (complete) superframe, "P" refers to a partial superframe, and n refers to the interval between repetitions of the partial superframes. Therefore, the series of full superframes may be represented by:

$$\frac{n-1}{n}.$$

16

Assume that there is some overspeed in central switching fabric 130:

$$\frac{n-1}{n} O = 1.$$

which indicates how often in the stream of superframes, device 100 can afford to have a partial superframe.

The interval at which S/C 520 can provide a partial superframe may be represented by:

$$n = \frac{O}{O-1},$$

where a typical value of O might be 1.1 (i.e., 10% overspeed). If

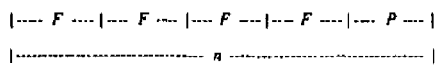

$$n = \frac{O}{O-1} = 11,$$

then a partial superframe may be sent every 11 frame intervals. By choosing an appropriate overspeed for device 100, it can be determined based on the above equations how much time to hold a partial superframe and when to send out a partial superframe. A tradeoff may be made of how much bandwidth to waste versus how much latency can be tolerated. It may be beneficial to program short flush intervals for low latency sensitive traffic (e.g., voice traffic) and long flush intervals for ordinary traffic. This information may be stored for each queue in flush interval memory 1310.

A schedule of potential flush events may be determined for each of the queues (block 1520). For example, the flush interval for a queue may be added to the current time value generated by clock 1320 to determine a flush target time value for the queue. The flush target time value for the queue may indicate the time at which the queue is scheduled to be flushed.

The frame assembly process may be tracked and any queues associated with partial superframes may be identified (block 1530). For example, assembly state machine 1340 may monitor the assembly of superframes associated with the queues and identify queues that are associated with partial superframes in needs flushing buffer 1342.

A queue that potentially needs flushing may be identified (block 1540). For example, scan logic 1350 may identify a queue that potentially needs flushing based on information in needs flushing buffer 1342. Scan logic 1350 may use a queue number associated with the queue to query needs flushing buffer 1342. Scan logic 1350 may also use the queue number to query flush target time memory to identify the flush target time value associated with the queue.

Scan logic 1350 may use the information from needs flushing buffer 1342, the flush target time value, and the current time value to determine whether the queue actually needs flushing. For example, if the information in needs flushing buffer 1342 indicates that the queue is associated with a partial superframe and the flush target time value matches (or exceeds) the current time value, then scan logic 1350 may determine that the queue needs flushing.

If the queue needs flushing (block 1550—YES), then a partial superframe associated with the queue may be sent (block 1560). In this case, scan logic 1350 may generate a flush event associated with the queue which may instruct or cause the partial superframe associated with the queue to be added to a queue/list of superframes pending transmission. Scan logic 1350 may also store an indicator (e.g., a flush bit) in flush target time memory that a flush event has occurred for the queue. If the queue does not need flushing (block 1550—NO), then the queue may wait for additional frames for the superframe that is being assembled (block 1570). In this case, scan logic 1350 may generate no flush event for the queue. This may be taken as an indication to wait for additional frames. The waiting may result in a complete superframe being assembled or a partial superframe being sent out at a later time.

This type of arrangement may have the following advantages: it improves the utilization of memory within central switching fabric 130 and it assures that proper bandwidth flows to egress line cards 120.

CONCLUSION

Implementations consistent with the principles of the invention may determine the manner in which partial frames and partial superframes are handled in a central shared memory switching fabric.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 8, 10, 12, 14, and 15, the order of the acts may differ in other implementations consistent with the principles of the invention. Also, non-dependent acts may be performed in parallel.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the present invention. Thus, the operation and behavior of the aspects were described without reference to the specific software code—it being understood that one of ordinary skill in the art would be able to design software and control hardware to implement the aspects based on the description herein.

Also, the term "data unit" may be used to refer generally to a container of data, such as a frame or a superframe. A data unit that is fully filled may be referred to as a "complete data unit" and a data unit that is less than fully filled with data may be referred to as a "partial data unit."

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a device, comprising:
   identifying, via a central switching fabric of the device, a data unit;
   determining, via the central switching fabric, that the data unit is a partial data unit, the partial data unit being a data unit that is less than fully filled with data;
   increasing, via the central switching fabric, a partial count when the data unit is the partial data unit;
   determining, via the central switching fabric, that the increased partial count is greater than a threshold; and
   filling, via one or more of a plurality of ingress units associated with the device, a subsequent data unit with data, where the subsequent data unit is filled to form a complete data unit when the partial count is greater than the threshold.

2. The method of claim 1, where the plurality of ingress units connect to the central switching fabric;
   the method further comprising:
   receiving a stream of datagrams at one of the ingress units;
   forming, by the one of the ingress units, the data unit from one or more of the datagrams;
   determining, by the one of the ingress units, whether to send the data unit to the central switching fabric as a partial data unit or as a complete data unit; and
   sending, by the one of the ingress units, the partial data unit or the complete data unit to the central switching fabric.

3. The method of claim 2, where determining whether to send the data unit includes:
   determining that another datagram has been received for the data unit, and
   determining that the partial data unit is to be sent to the central switching fabric when no other datagram has been received for the data unit.

4. The method of claim 2, where determining whether to send the data unit includes:
   waiting a predetermined amount of time, and
   determining that the partial data unit is to be sent to the central switching fabric when the complete data unit has not been formed within the predetermined amount of time.

5. The method of claim 1, where the plurality of ingress units connect to the central switching fabric; and
   the method further comprising:
   forming the data unit at one of the ingress units; and
   sending, by the one of the ingress units, the data unit to the central switching fabric.

6. The method of claim 5, further comprising:
   notifying, by the central switching fabric, the one of the ingress units to send no additional partial frames when the partial count is greater than the threshold.

7. The method of claim 6, where filling a subsequent data unit with data to form a complete data unit includes:
   holding, by the one of the ingress units, the subsequent data unit until the subsequent data unit is completely filled with data.

8. The method of claim 5, where determining whether the data unit is the partial data unit includes at least one of:
   checking a field in a header of the data unit sent from the one of the ingress units to determine that the data unit is the partial data unit, or
   checking a notification message sent from the one of the ingress units to determine that the data unit is the partial data unit.

9. The method of claim 1, where increasing a partial count includes:
   maintaining a plurality of partial counters,
   determining one of the partial counters associated with the data unit, and
   increasing the partial count associated with the determined one of the partial counters by one when the data unit is the partial data unit.

10. The method of claim 1, where determining that the partial count is greater than a threshold includes:

maintaining a plurality of programmable thresholds,
determining one of the programmable thresholds associated with the data unit, and
comparing the partial count to the determined one of the programmable thresholds.

11. The method of claim 1, where the data unit is a frame that stores one or more datagrams or a superframe that stores a plurality of frames.

12. The method of claim 1, further comprising:
storing the partial data unit and the complete data unit in a memory.

13. The method of claim 1, further comprising:
storing information associated with the partial data unit and the complete data unit in a queue to await transmission.

14. A system, comprising:
means for determining that a data unit is a partial data unit or a complete data unit, the partial data unit being a data unit that is less than fully filled with data, the complete data unit being a data unit that is fully filled with data;
means for increasing a partial count when the data unit is the partial data unit;
means for determining that the partial count is greater than a programmable threshold; and
means for holding a subsequent data unit until the subsequent data unit is formed into a subsequent complete data unit when the partial count is greater than the programmable threshold.

15. The system of claim 14, further comprising:
means for forming the data unit, and
where the means for determining that the data unit is the partial data unit further includes:
means for checking a field in a header of the data unit to determine that the data unit is the partial data unit, or
means for checking a notification message sent from the means for forming the data unit to determine that the data unit is the partial data unit.

16. The system of claim 14, where the means for increasing the partial count includes:
means for maintaining a plurality of partial counters,
means for determining one of the partial counters associated with the data unit, and
means for increasing the partial count associated with the determined one of the partial counters by one when the data unit is the partial data unit.

17. The system of 14, where the means for determining that the partial count is greater than the programmable threshold includes:
means for maintaining a plurality of programmable thresholds,
means for determining one of the programmable thresholds that is associated with the data unit, and
means for comparing the partial count to the determined one of the programmable thresholds.

18. A device, comprising:
a set of ingress units, one of the ingress units to:
receive a plurality of datagrams,
form a frame from one or more of the datagrams, and
output the frame, and
a central switching fabric connected to the ingress units, the central switching fabric to:
determine whether the frame from the one of the ingress units is a partial frame, the partial frame being a frame that is less than fully filled with data,
determine that a number of partial frames is greater than a threshold when the frame is the partial frame, and
notify the one of the ingress units to send complete frames when the number of partial frames is greater than the threshold, where the complete frames are frames that are completely filled with data.

19. The device of claim 18, where when determining whether a number of partial frames is greater than a threshold, the central switching fabric is to:
maintain a plurality of partial counters,
maintain a plurality of programmable thresholds,
identify one of the partial counters and one of the programmable thresholds associated with the partial frame, and
compare a count value associated with the identified partial counter to a threshold value associated with the identified programmable threshold, and
determine that the number of partial frames is greater than the threshold when the count value is greater than the threshold value.

20. The device of claim 18, where said one of the ingress units is further to determine whether to send the frame as a partial frame or as a complete frame.

21. The device of claim 20, where said one of the ingress units is further to determine that the partial frame is to be sent to the central switching fabric when no other datagram has been received for the frame.

22. The device of claim 20, where said one of the ingress units is further to:
wait a particular amount of time, and
determine that the partial frame is to be sent to the central switching fabric when the complete frame has not been formed within the particular amount of time.

23. The device of claim 18, where notify the one of the ingress units to send complete frames when the number of partial frames is greater than the threshold, the central switching fabric is to notify said one of the ingress units to send no additional partial frames when the partial count is greater than the threshold.

24. The device of claim 18, where the central switching fabric, when determining whether the frame is the partial frame, is further to at least one of:
check a field in a header of the frame sent from the one of the ingress units, or
check a notification message sent from the one of the ingress units.

25. A device, comprising:
a set of ingress units, at least one of the ingress units to:
receive a plurality of datagrams,
form a frame from one or more of the datagrams, and
output the frame;
a set of egress units; and
a central switching fabric connected to the ingress units and the egress units, the central switching fabric to:
store a plurality of the frames as superframes in a memory,
identify one of the superframes that is ready to be sent to one of the egress units,
determine that the identified superframe is a partial superframe, the partial superframe being a superframe that is less than fully filled with frames,
determine that a number of partial superframes is greater than a threshold, and
complete said identified superframe when the number of partial superframes is greater than the threshold.

26. The device of claim 25, where when determining whether a number of partial superframes is greater than a threshold, the central switching fabric is to:
maintain a plurality of partial counters,
maintain a plurality of programmable thresholds, identify one of the partial counters and one of the programmable thresholds associated with the partial superframe, and compare a count value associated with the identified partial counter to a threshold value associated with the identified programmable threshold, and determine that the number of partial superframes is greater than the threshold when the count value is greater than the threshold value.

27. The device of claim 26, where said central switching fabric is further to maintain a plurality of queues, one of said plurality of queues is associated with said one of the egress units, said identified partial counter and said identified programmable threshold are associated with said one of said plurality of queues, and said one of the egress units is to acquire the identified superframe using information in said one of said plurality of queues.

28. The device of claim 25, where the central switching fabric is further to maintain a queue associated with said one of the egress units, and where said one of the egress units is to acquire the identified superframe using information in said queue.

29. The device of claim 28, where the central switching fabric is further to delay providing said information in said queue to said one of the egress units when completing the identified superframe.

* * * * *